(12) United States Patent
Mabuchi et al.

(10) Patent No.: US 8,259,344 B2
(45) Date of Patent: Sep. 4, 2012

(54) INK JET RECORDING APPARATUS AND INK JET PRINTING METHOD

(75) Inventors: Hidehisa Mabuchi, Kawasaki (JP); Tsuyoshi Shibata, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 653 days.

(21) Appl. No.: 12/333,627

(22) Filed: Dec. 12, 2008

(65) Prior Publication Data

US 2009/0161130 A1    Jun. 25, 2009

(30) Foreign Application Priority Data

Dec. 20, 2007    (JP) ................................. 2007-329337

(51) Int. Cl.
*G06F 15/00* (2006.01)
(52) U.S. Cl. .......... 358/1.8; 358/1.9; 358/474; 358/538; 347/19; 347/40
(58) Field of Classification Search .................... 347/40, 347/41, 15, 19; 358/538, 1.8, 1.1, 474, 1.9
See application file for complete search history.

(56) References Cited

U.S. PATENT DOCUMENTS

| | | | | |
|---|---|---|---|---|
| 5,528,361 | A * | 6/1996 | Sakata ........................... | 358/296 |
| 5,917,519 | A * | 6/1999 | Arai et al. ...................... | 347/41 |
| 6,419,340 | B1 * | 7/2002 | Wickham et al. ............... | 347/15 |
| 7,438,374 | B2 | 10/2008 | Shibata et al. | |
| 2002/0167565 | A1 * | 11/2002 | Maeda et al. ................... | 347/40 |
| 2003/0086133 | A1 * | 5/2003 | Schinner ........................ | 358/538 |
| 2008/0150979 | A1 | 6/2008 | Shibata et al. | |
| 2009/0002414 | A1 | 1/2009 | Shibata et al. | |

FOREIGN PATENT DOCUMENTS

| | | |
|---|---|---|
| JP | 2002-292910 A | 10/2002 |
| JP | 2006-305993 A | 11/2006 |

OTHER PUBLICATIONS

Japanese Office Action issued in corresponding application No. 2007-329337 dated Mar. 30, 2012- 3 pages.

* cited by examiner

*Primary Examiner* — Benny Q Tieu
*Assistant Examiner* — Ashish K Thomas
(74) *Attorney, Agent, or Firm* — Fitzpatrick, Cella, Harper & Scinto

(57) ABSTRACT

There is provided an ink jet printing apparatus in which unevenness that may occur at the edges of printing areas can be reduced also for various printing media including unspecified printing media. In the ink jet printing apparatus which uses a print head for ejecting ink and performs printing by scanning a predetermined area on a printing medium with the print head multiple times, the multiple times of scan including a forward scan and a backward scan, the apparatus comprising: a control unit that cases the print head to print patterns each of which is printed through multiple times of scan of the print head and has different portions in a time interval between the multiple times of scan, with different printing ratios for the multiple times of scan; and a setting unit that sets the printing ratios based on the test patterns.

6 Claims, 23 Drawing Sheets

SMALLER TIME DIFFERENCE IS 0.2 SECONDS FOR CARRIAGE REVERSING
LARGER TIME DIFFERENCE IS THE SUM OF
0.2 SECONDS FOR CARRIAGE REVERSING AND 2.2 SECONDS FOR BACK-AND-FORTH SCANNING

INK JET RECORDING APPARATUS AND INK JET PRINTING METHOD

BACKGROUND OF THE INVENTION

1. Field of the Invention

The present invention relates to ink jet printing apparatuses and ink jet printing method, in which ink is ejected through nozzles provided in a print head to print an image.

2. Description of the Related Art

In ink jet printing apparatuses, even a small amount of nozzle-by-nozzle structural variation that may occur during the process of manufacturing their print heads can affect the ejecting amount and direction of ink through each nozzle, which causes deterioration in image quality such as streaks and uneven density in printed images. In order to eliminate such uneven image density, there has been proposed a multi-path printing method (separate printing technique) in which a print head scans a predetermined area on a printing medium multiple times to print images sequentially. In the multipath printing method, the print head passes multiple times each printing area and the predetermined area are printed through different groups of nozzles.

The multipath printing method has the advantages of reducing uneven image density due to eject amount distribution among nozzles and/or misaligned ink landing. At the same time, the multipath printing technique has a lower throughput as the number of scanning for printing before the completion of an image increases.

Hence, a bi-directional printing method has been adopted to increase for throughput degradation, in which printing is performed not only during forward scanning of a print head but also during backward scanning of the print head in the reverse direction after the printing operation during the forward scanning.

However, bi-directional multipath printing with a relatively small number of scanning (two to six times) may suffer from so-called "time difference unevenness" and therefore image deterioration. Specifically, time difference unevenness is a phenomenon particularly prominent when reversing a high-speed print head (kickback) and printing large-sized (approximately A4-sized or larger) images, and it is therefore necessary to eliminate time difference unevenness to increase throughput when printing large-sized images.

Here will be described "time difference unevenness" with reference to FIGS. 21 to 23.

The time difference unevenness will be explains to an example the case two-scan printing with reference to FIG. 21. In bi-directional two-scan printing, a head carriage starts a first scanning from the left-most printing start position shown in FIG. 21 and about half the group of nozzles on the upstream end side of conveying direction of the nozzle arrays are used to print nearly printing half dots which should be printed. Subsequently, the scanning direction of the carriage is reversed at the right-hand edge and the printing medium is conveyed by a predetermined feed amount (half of the nozzle arrays). Then during a second scanning, to-be-printed dots other than printed on the printing area through the first scan are printed in a printing area A on the downstream end side, while nearly printing half dots are printed in a printing area B on the upstream end side, as is the case in the first scanning. Subsequently during a third scanning, the scanning direction of the carriage is further reversed at the printing start position side and the printing medium is conveyed by a predetermined feed amount. Then approximately half of all the to-be-printed dots are printed through the upstream end side of the nozzle arrays, as is the case in the first scanning, while to-be-printed dots other than previously printed in the printing area B are printed through the downstream end side. This image will be completed by repeating the sequence above.

In the case above, focusing on the printing area A in the image printing start region, the time interval between the first scan printing and the second scan printing at the left-most printing start position side is the sum of the time for printing by the time for two printing scan and the time for reversing of the head carriage. Additionally, if the time for paper feeding that is performed simultaneously with the reversing of the head carriage is longer than the reversing time, the time difference is also added. Meanwhile, in the adjacent printing area B, the time for reversing (reversing of the head carriage and paper feeding) is only required, and therefore, the time interval between the first scan printing and the second scan printing is to be very short.

Such a time difference increases with a greater image printing width of main scanning direction. As for large-sized printing of A4-size or larger paper, for example, the difference at the edge between the inter-scan time differences in the printing areas A and B increases.

In the case above, the image density (color tone) is accordingly different between the adjacent printing areas at the edges of the image, it may cause deterioration in image quality as uneven density at the predetermined width of printing area (a paper feed pitch).

Four-path printing for printed by four-scan will also be described with reference to FIGS. 22A and 22B, and three-path printing for printed by three-scan will be described with reference to FIG. 23.

In FIG. 22A shows the aspect that an image is printed by four scans printing. FIG. 22B shows the image of the left edge part of each printing area, i.e. the image of the edge where first scan is started. In FIG. 22A, during a first scanning for printing 14-001, approximately one-fourth of the to-be-printed dots are printed in a printing area A, and then during a second scanning for printing 14-002, another one-fourth of the to-be-printed dots are printed. In the left edge part of the printing area A, it require the time for back-and-forth scanning and reversing of the carriage between the time to be printed by the first printing scanning and to start to print by the second printing scanning. Subsequently, it require the time only for reversing of the carriage between the time to be printed by the second printing scanning and to start to print by the third printing scanning 14-003. It require the time for back-and-forth scanning and reversing of the carriage between the time to be printed by the third printing scanning and to start to print by the forth printing scanning 14-004. Meanwhile, On the left part area of the printing area 14-B, it require the time only for reversing of the carriage between the time to be printed by the first printing scanning 14-002 and to start to print by the second printing scanning 14-003. It require the time for back-and-forth scanning and reversing of the carriage between the time to be printed by the second printing scanning 14-003 and to start to print by the third printing scanning 14-004. It require the time only for reversing of the carriage between the time to be printed by the third printing scanning 14-004 and to start to print by the forth printing scanning 14-005.

On the left edge part of the image shown in FIG. 22B, such a difference in the combination of time differences is one of the factors that cause uneven image density (color tone). And on the right edge part of the image, same uneven image density occurs, and then comb-like strip-shaped unevenness due to alternate occurrence of uneven image density both edge part. Even in the case of three-path printing such as shown in FIG. 23, time difference unevenness will occur similarly at the edges of the printing areas A and B.

In order to reduce such time difference unevenness, there has been known a method in which a printing ratio are set to their respective different values of printing ratio per each group of nozzles (refer to Japanese Patent Laid-Open No. 2002-292910, for example).

Meanwhile, time difference unevenness is an image deterioration caused by a time difference between a previous scanning and printing and the next scanning and printing, and the degree of occurrence of unevenness depends significantly on the type of printing medium. That is, the degree of ink penetration depends on the type of printing medium, which results in a significant difference in the degree of unevenness. Therefore, the most suitable control method for reduction of time difference unevenness and, more particularly, the most suitable printing ratio set for each printing scan is different for each type of printing medium. For this reason, the most suitable printing ratio for reduction of time difference unevenness has conventionally been set for each specific type of printing medium assumed to be used in an ink jet printing apparatus.

However, the most suitable printing ratio for reduction of time difference unevenness varies according to the type of printing medium. Therefore, in the printing apparatus that the most suitable printing ratio for reduction of time difference unevenness is arranged only for a specific type of printing medium, it may be impossible to reduce image deterioration due to time difference unevenness sufficiently when unspecified types of printing media are used.

SUMMARY OF THE INVENTION

The present invention has been made in consideration of the above-described circumstances, and an object thereof is to provide an ink jet printing apparatus and printing method in which image deterioration (unevenness) that may occur at the edges of printing areas can be reduced also for various printing media including unspecified printing media.

In order to achieve the foregoing object, the present invention is directed to an ink jet printing apparatus which uses a print head for ejecting ink and performs printing by scanning a predetermined area on a printing medium with the print head multiple times, the multiple times of scan including a forward scan and a backward scan, the apparatus comprising: a control unit that cases the print head to print patterns each of which is printed through multiple times of scan of the print head and has different portions in a time interval between the multiple times of scan, with different printing ratios for the multiple times of scan; and a setting unit that sets the printing ratios based on the test patterns.

In accordance with the configuration above, image deterioration (unevenness) at the edges of a printing medium can be reduced for various printing media including unspecified printing media.

Further features of the present invention will become apparent from the following description of exemplary embodiments (with reference to the attached drawings).

DESCRIPTION OF THE EMBODIMENTS

Embodiments of the present invention will hereinafter be described in detail with reference to the accompanying drawings.

First Embodiment

Figure 1:
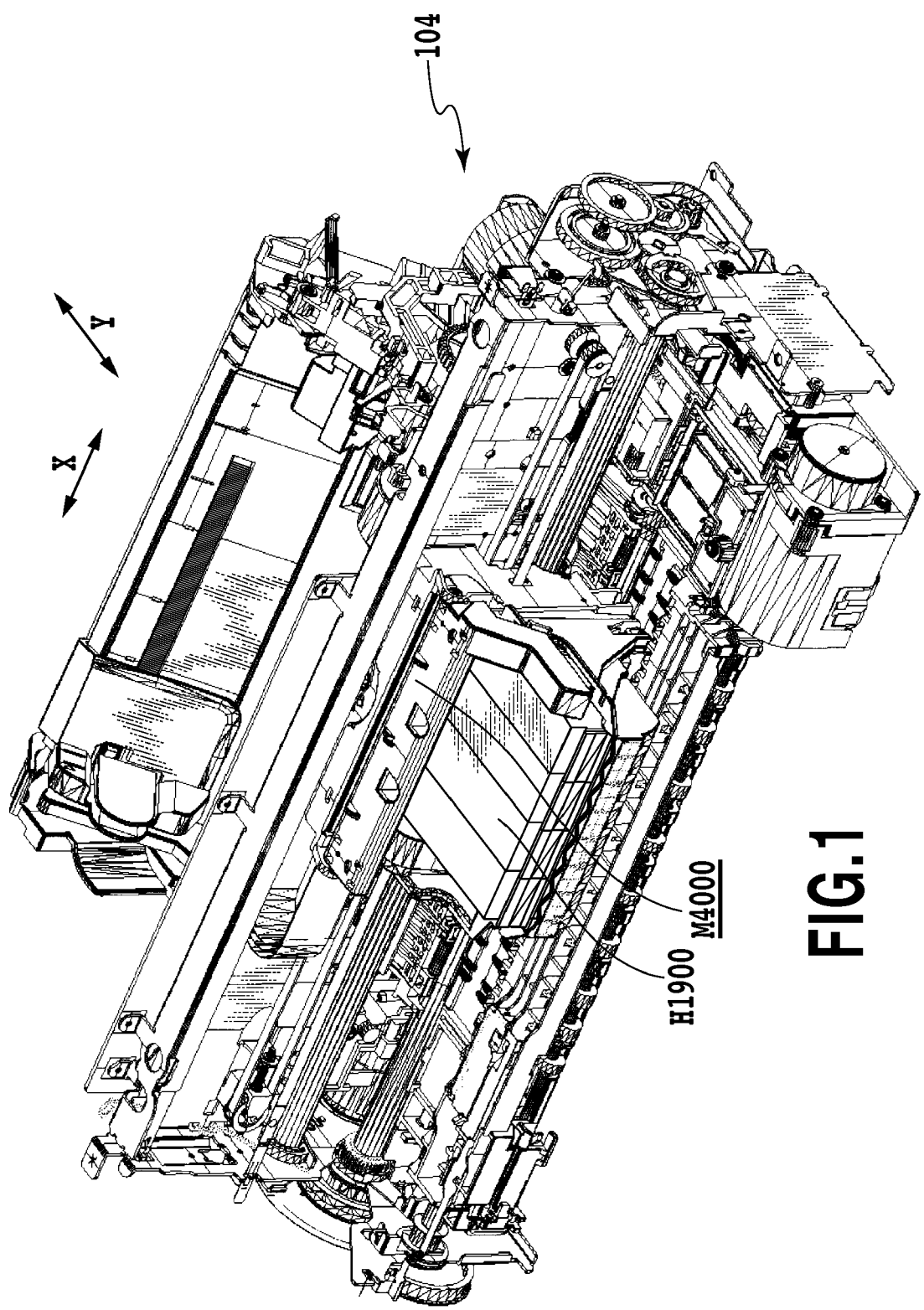
FIG. 1 is a perspective view showing an ink jet printing apparatus according to a first embodiment.

FIG. 1 is a perspective view showing an ink jet printing apparatus (printer) 104 according to the present embodiment. The carriage M4000 is equipped with print heads and ink tanks H1900 for supplying, respectively, C, M, Y, and K colors of ink to the print heads.

The printer 104 is a so-called serial type one in which a print head adapted to eject ink scans a printing medium during which the ink is ejected for printing. The print heads are prepared to correspond respectively to cyan (C), magenta (M), yellow (Y), and black (K) colors of ink. Then the print heads can scan a printing medium such as printing paper by being attached to the carriage.

The carriage M4000 moves in the main scan direction (X direction in the drawing) and each nozzle in the print heads ejects ink at a predetermined timing based on binary separate printing data. After one primary scanning of the print heads, the printing medium is conveyed in the sub-scan direction (Y direction in the drawing) by a predetermined amount. The image printing for each scanning area will then be completed by sequentially repeating bi-directional scanning and printing in the main scan direction and conveyance by the predetermined amount in the sub-scan direction.

Figures 2A, 2B:
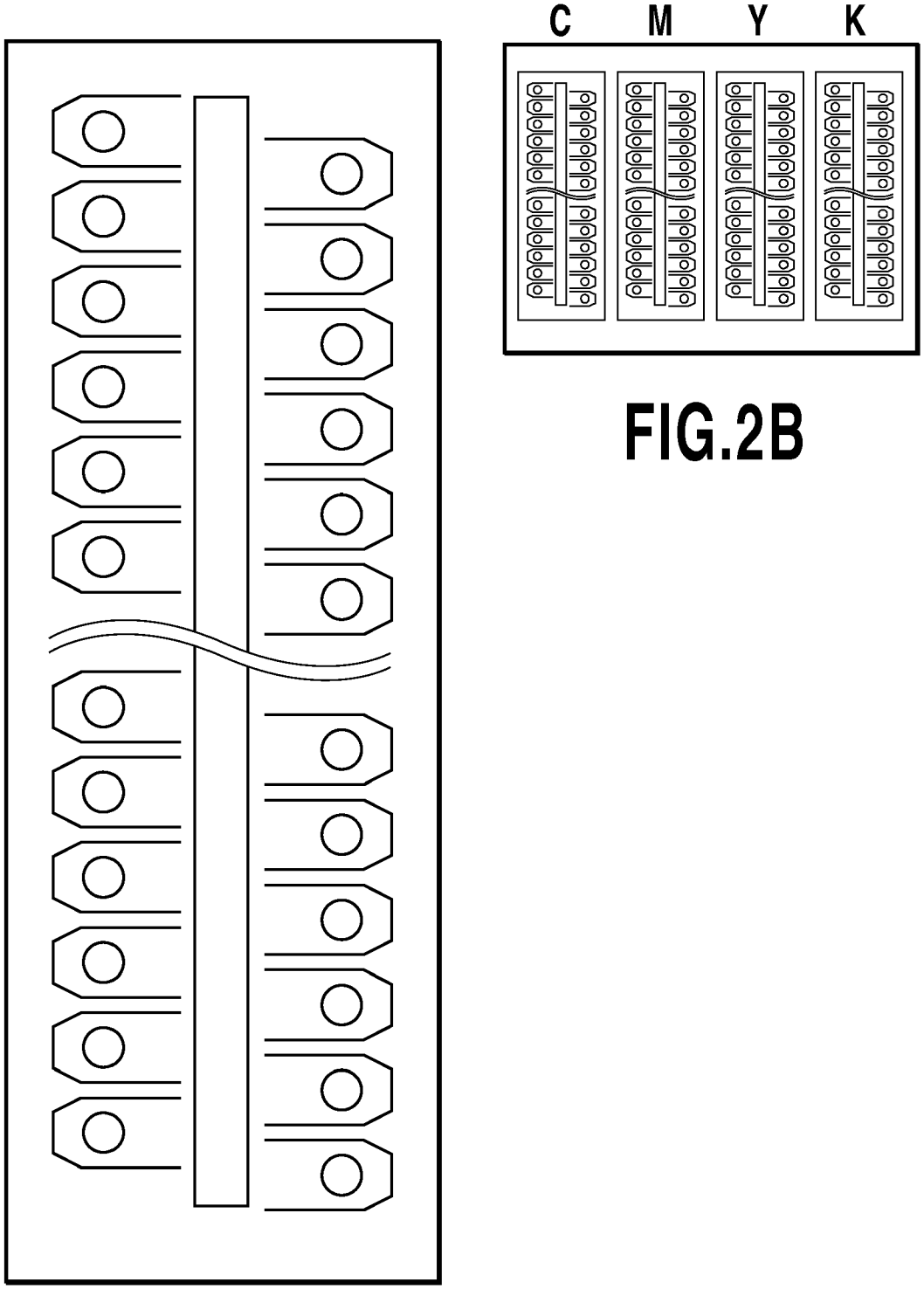
FIGS. 2A and 2B are views showing a nozzle arrangement in each print head according to the first embodiment.

FIGS. 2A and 2B are views showing a nozzle arrangement in each print head according to the present embodiment. FIG. 2A is a view showing nozzle arrays per color, while FIG. 2B is a view showing nozzle arrays of CMYK provided in each print head. The print heads according to the present embodiment each have 1280 nozzles per color, which are arranged at a resolution of 1200 dpi. The volume of a droplet of ink ejected through each nozzle is about 4.5 pl.

Figure 3:
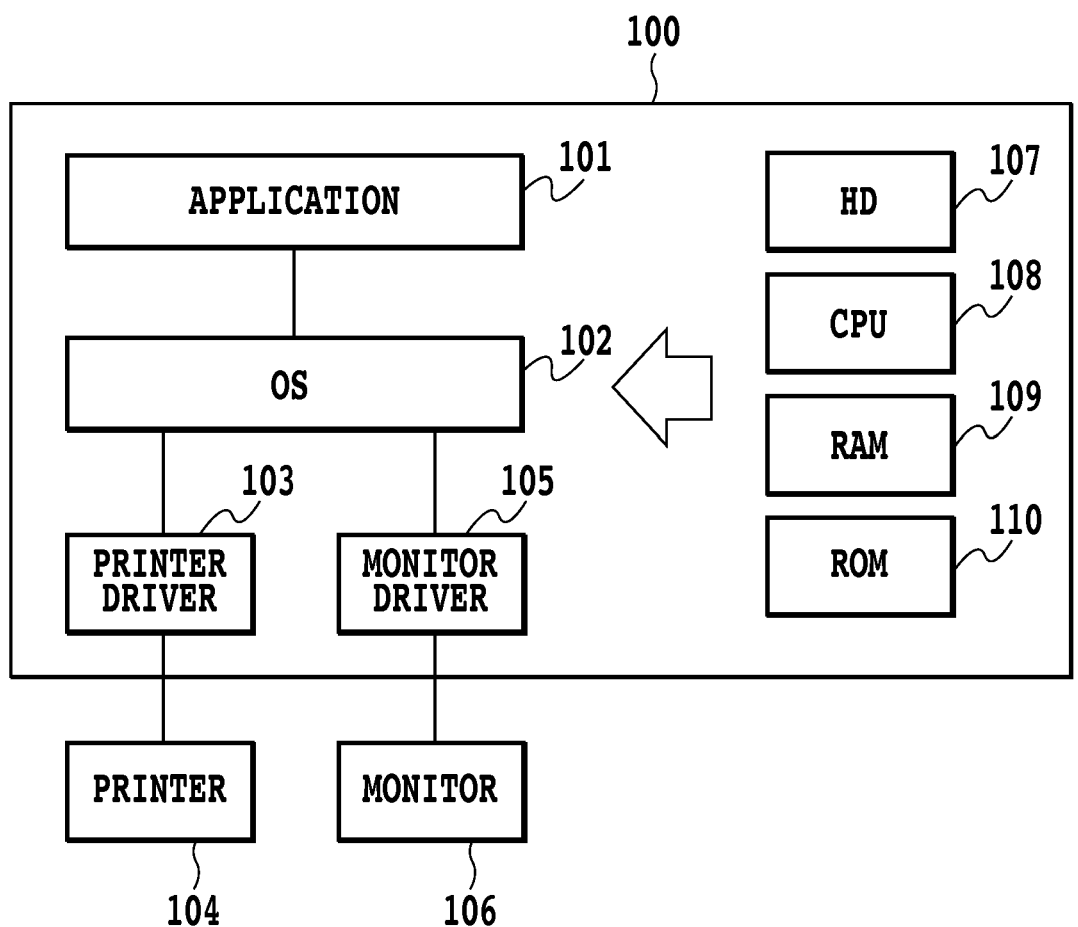
FIG. 3 is a block diagram showing the configuration of, mainly, hardware and software in a personal computer according to the first embodiment.

FIG. 3 is a block diagram showing the configuration of, mainly, hardware and software in a personal computer (hereinafter referred to also as PC) that serves as a host device according to the present embodiment. The PC 100 is adapted to generate image data to be printed by the printer 104.

In FIG. 3, the PC 100 gets software including application software 101, printer driver 103, and monitor driver 105 to work through an operating system (OS) 102. The application software 101 is adapted to perform processing for word processors, spreadsheets, Internet browsers, and the like. The monitor driver 105 is adapted to execute processing such as creating image data to be displayed on a monitor 106. The printer driver 103 is adapted to perform drawing processing for various groups of drawing commands (e.g. image drawing commands, text drawing commands, and graphics drawing commands etc.) issued from the application software 101 to the OS 102. The printer driver 103 is then adapted to execute image processing to be described hereinafter with reference to FIG. 2 to generate multi-valued or binary image data to be used in the printer 104.

The PC 100 includes a hard disk (HD) 107, CPU 108, RAM 109, and ROM 110 etc., as various hardware for software operation. The CPU 108 is adapted to execute processing thereof in accordance with the foregoing software programs stored in the hard disk 107 and/or ROM 110, and the RAM 109 is used as a work area when executing the processing.

The printer 104 can perform multipath printing. For this, masks to be described hereinafter are stored in a predetermined memory and, when printing, the memory is referred to for a mask that depends on the direction and number of scanning as well as ink color so as to perform processing to generate binary separate printing data. Also, if multi-valued image data is input to the printer 104, the multi-valued data is divided in accordance with distribution ratio information to be described hereinafter, and the divided multi-valued data is then converted into separate printing data.

Figure 4:
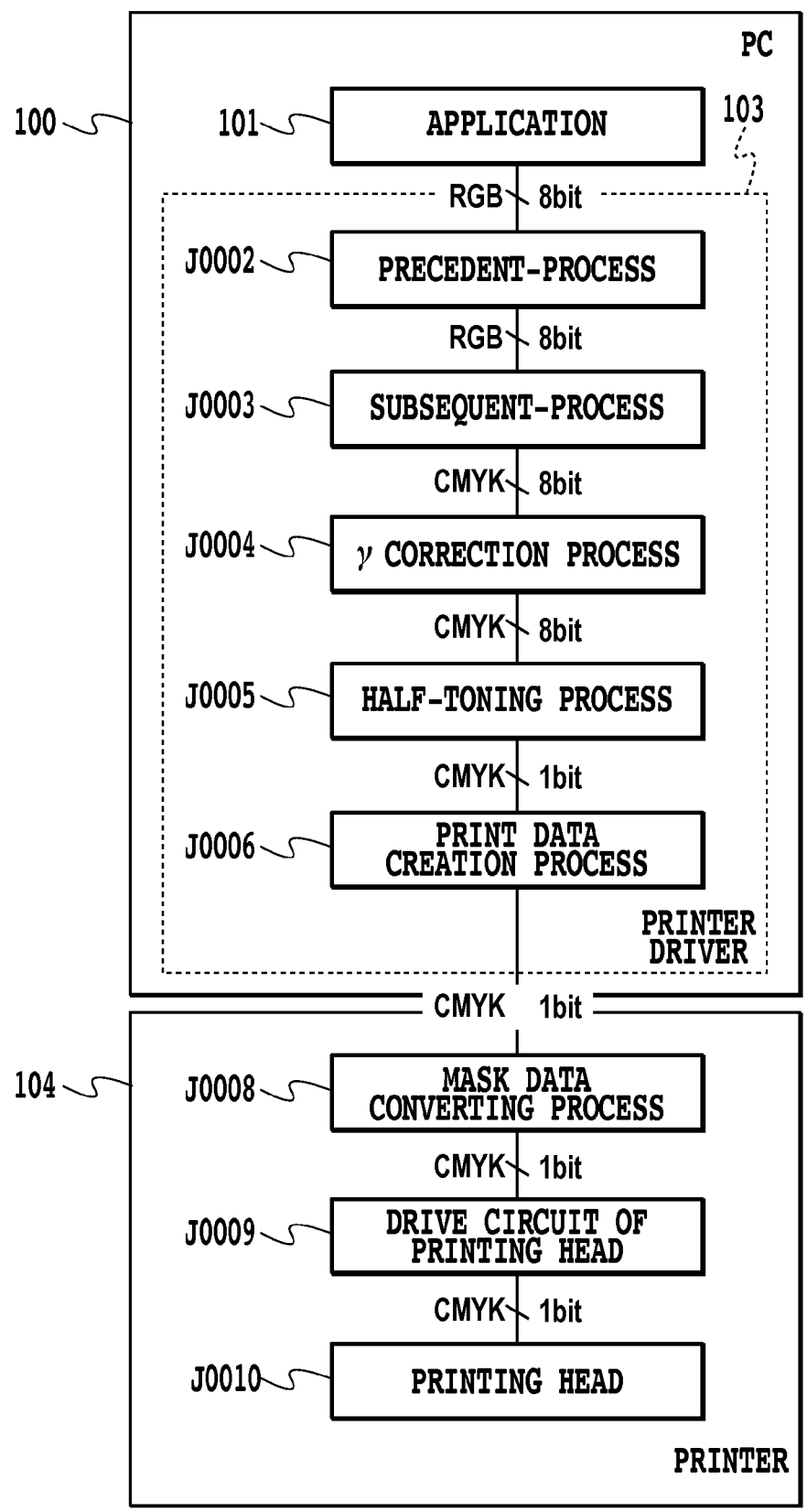
FIG. 4 is a block diagram illustrating data processing according to the first embodiment.

FIG. 4 is a block diagram illustrating major data processing in the PC 100 and the printer 104 when printing with the printer 104.

As mentioned above, the ink jet printer 104 according to the present embodiment uses CMYK four colors of ink for printing. For this, print heads J0010 adapted to eject these four colors of ink are included. On the application 101 in the PC 100, users can create image data to be printed by the printer 104. The image data created on the application 101 is then transferred to the printer driver 103 when printing. The printer driver 103 executes processing such as preceding processing J0002, subsequent processing J0003, γ-correction J0004, binarization J0005, and printing data creation J0006, respectively.

The preceding processing J0002 performs a color gamut conversion by which the color gamut of a display on which application screens are displayed is converted into the color gamut of the printer 104. Specifically, a three-dimensional LUT is used to convert 8-bit image data R, G, and B, respectively, into 8-bit data R, G, and B within the color gamut of the printer. In the subsequent processing J0003, colors for reproducing the converted color gamut are then separated into ink colors. Specifically, 8-bit data C, M, Y, and K are processed and obtained that correspond to an ink combination for reproducing colors that the 8-bit data R, G, and B obtained through the preceding processing J0002 express. The γ-correction J0004 performs a γ-correction for each CMYK data obtained through color separation. Specifically, a conversion is performed so that each of the 8-bit data C, M, Y, and K obtained through color separation is linearly corresponds to the gradation characteristics of the printer. It is noted that at this processing stage, the data may be transferred to the printer 104 as multi-valued input image data. Next, the binarization J0005 performs a quantization by which the γ-corrected 8-bit data C, M, Y, and K are converted, respectively, into 1-bit data C, M, Y, and K. Finally, in the printing data creation J0006, printing data is created by adding printing control data, etc., to the image data containing multi-valued data before the quantization or binarized 1-bit data C, M, Y, and K. Here, the binary image data includes dot printed data and dot non-printed data that indicate, respectively, printing and non-printing of dots. Also, the printing control data consists of "printing medium information," "printing quality information," and "other control information" such as a paper feed method.

The thus generated printing data is supplied to the printer 104.

Meanwhile, the printer 104 performs a mask data conversion J0008 for the binary image data included in the input printing data. In the mask data conversion J0008, mask patterns that are stored preliminarily in a predetermined memory of the printer are used to perform an AND processing on the input binary image data and thereby to obtain binary separate printing data. Multi-valued input image data, if input, is converted into separate multi-valued data and then binarized, based on the distribution ratio information to be described hereinafter, to obtain binary separate printing data. Binary separate image data to be used for each scanning in multipath printing is thus generated and a timing of actual ink ejecting is determined. It is noted that the binary separate printing data includes dot printed data and dot non-printed data.

Figure 5:
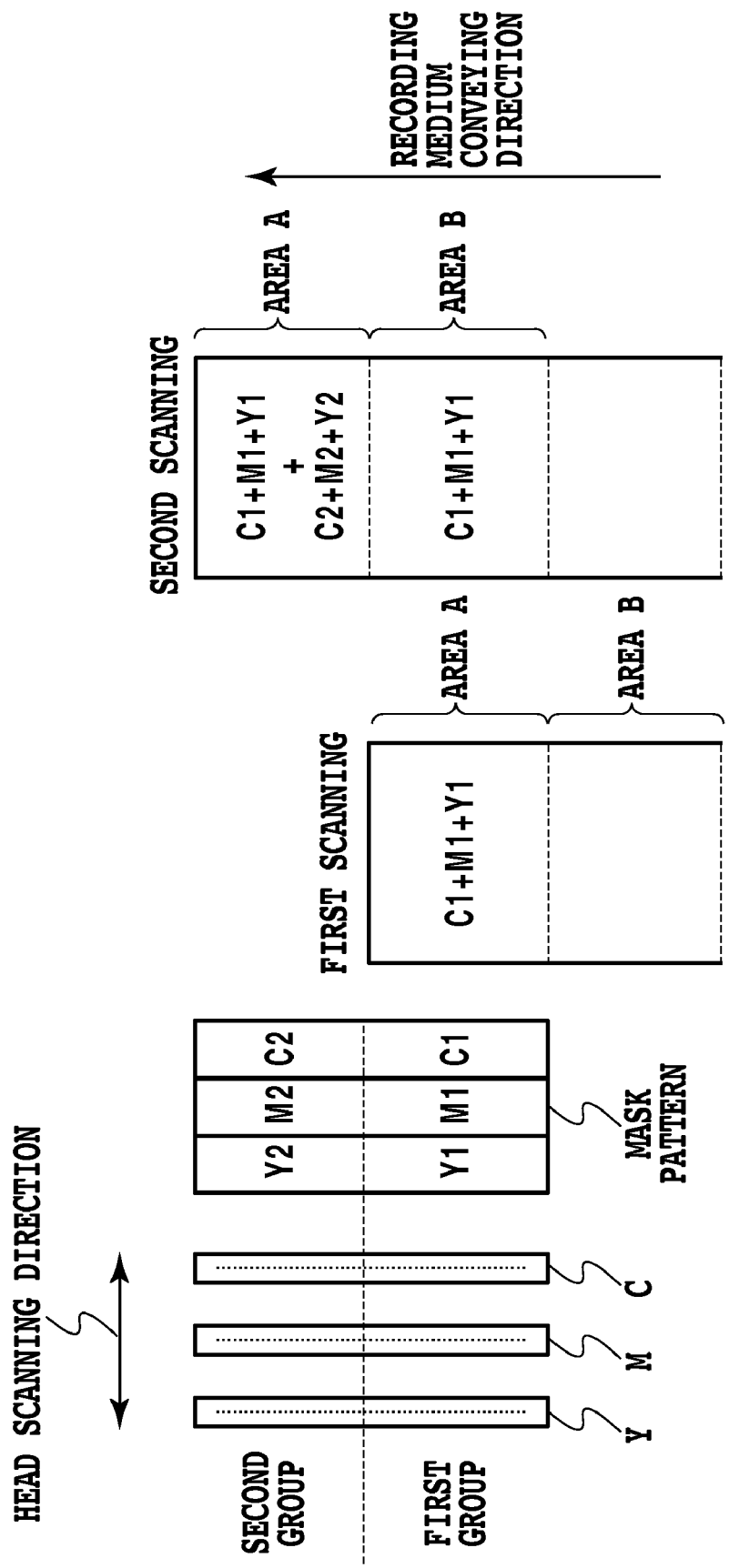
FIG. 5 is a schematic view showing print heads, mask patterns, and a printing medium according to the first embodiment.

FIG. 5 is a schematic view showing print heads, mask patterns, and a printing medium when printing with the printer 104. It is noted that although the present embodiment is for the case of forming an image through four paths in the forward and backward directions as described hereinafter, here will be described the case of forming an image through two paths for the sake of simplification. In addition, although the printer 104 according to the present embodiment is a printing apparatus including CMYK four colors of ink, here will be described the case of printing using three colors of CMY for the sake of simplification.

Color nozzle arrays are divided into two groups, first and second groups, each group including 640 nozzles. A mask pattern is corresponded to each group, and the size of each mask pattern is 640 pixels in the main scan direction and 640 pixels in the sub-scan direction. Also, two mask patterns (Y1 and Y2, M1 and M2, C1 and C2) that are related to the group of nozzles of the same color ink are complementary to each other, and the printing of an area corresponding to 640×640 pixels is configured so as to be completed by superimposing these patterns.

Ink is ejected onto the printing medium while the color nozzle arrays scan the medium in the main scan direction (X direction) that is approximately perpendicular to the nozzle arrangement direction. If completion of head scanning, the printing medium is conveyed by the width of one group (width of 640 pixels here) in the sub-scan direction (y direction) that is perpendicular to the scanning direction. Thus, the image printing of an area on the printing medium that corresponds to the width of each group will be completed with two times of scanning.

Specifically, the first scanning uses the first group in the order of CMY for printing in the area A on the printing medium. Therefore, the first scanning uses the mask pattern C1M1Y1 for the area A. Next, the second scanning uses the second group in the order of YMC for the rest of printing in the area A where the printing by the first scanning has been completed, while using the first group in the order of YMC for printing in the area B where printing has not yet been completed. Therefore, the second scanning uses the mask pattern C2M2Y2 for the area A, while using the mask pattern C1M1Y1 for the area B. Further, respective areas will be printed by continuing such an operation.

Next will be described a typical printing method by the printer according to the present embodiment with reference to FIG. 6. Here will also be described a method of printing an image through two paths. It is noted that the image is a so-called solid one in which all pixels are formed with dots, for the sake of descriptive simplicity.

Figure 6:
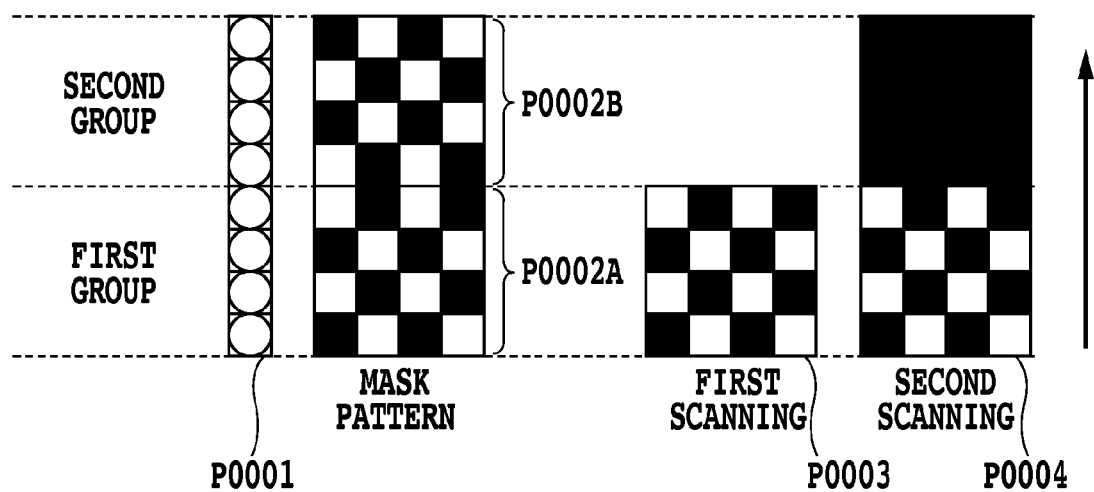
FIG. 6 is a view for illustrating a typical printing method according to the first embodiment.

P0003 and P0004 in FIG. 6 are shown images completed by two-path printing and the pixels on which a dot is printed denoted by black. Therefore, the dot arrangement is a direct reflection in the image P0003 and P0004 of the arrangement of printable pixels (the pixel which printed among the image data of binary) in the mask P0002A and B that are used for generation of the dot printing data.

In the first scanning, dot printing data of the first group is generated using a mask pattern P0002A. Then, the printing medium is conveyed by the width of one nozzle group in the direction indicated by the arrow in the drawing. In the next second scanning, dot printing data of the first group for the area shifted by the above conveyance amount is also generated using the mask pattern P0002A. Further, dot printing data of the second group for the area where the first group is used for printing during the first scanning is generated using a mask pattern P0002B. The image is completed with this two times of scanning for printing.

Multipath printed images will be formed sequentially by alternately repeating the foregoing primary scanning and secondary scanning for printing.

In the present embodiment, the printing ratio in respectively printing scan of the separating mask for separating the binary printing data (the ratio of pixels to be allowed printing to all of the pixels) is selected for each type of printing medium. In the printing apparatus according to the present embodiment, most suitable separating mask pattern of the printing ratio for each specific type of medium is preliminarily stored in, for example, the ROM 110. Furthermore, in the present embodiment, the most suitable printing ratio for reduction of image unevenness is determined also in accordance with the following procedure so that unspecified media can also be accepted for which no printing ratio is arranged.

Figure 7:
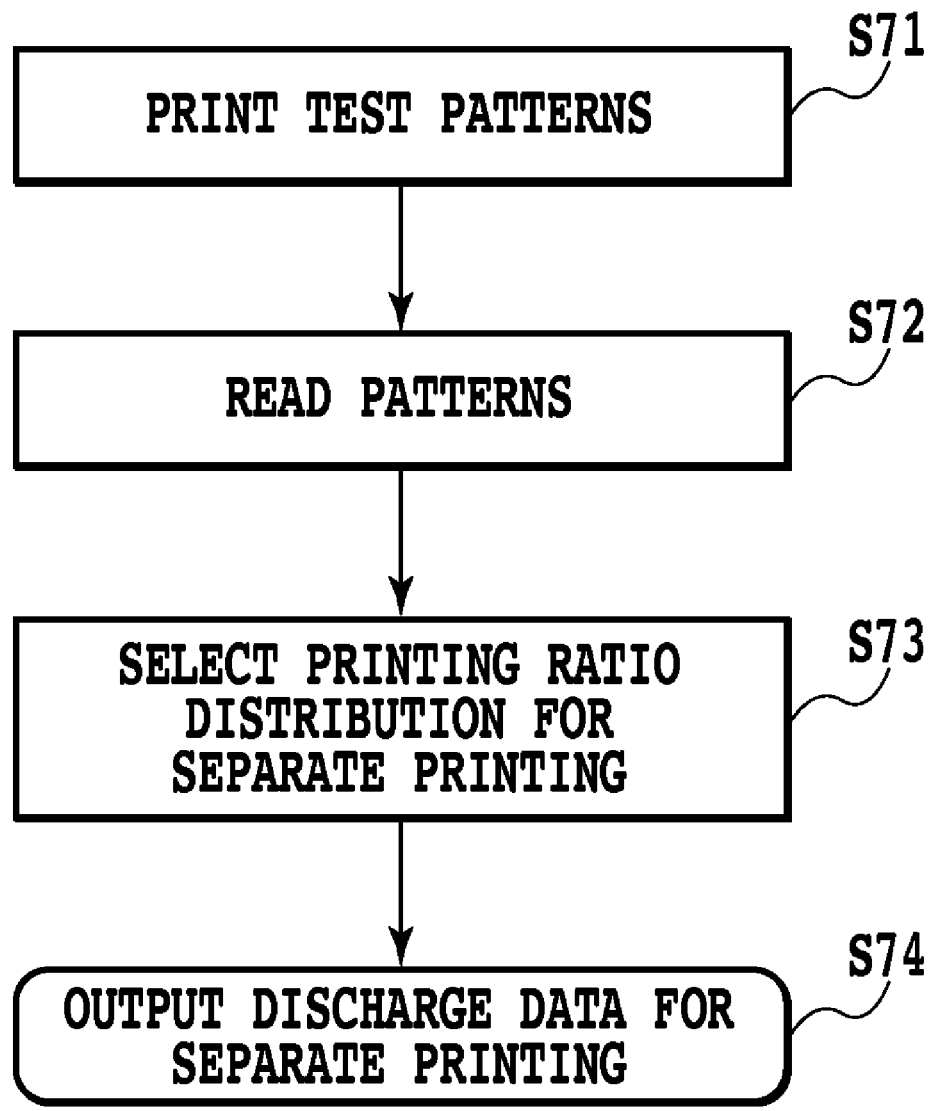
FIG. 7 is a flow chart schematically showing processing for printing ratio selection performed in the first embodiment.

FIG. 7 is a flow chart schematically showing processing for printing ratio selection performed in the present embodiment. Preliminarily stored in, for example, the ROM 110 predetermined test patterns are first printed (S71). Next, the printed test patterns are read (S72). A user is then selected the printing ratio for separate of most reducing unevenness from among the test pattern (S73). In actual printing, ejecting data is then generated using a mask pattern of printing ratio based on to be printed test pattern, and the ejecting data is used for printing on a printing medium (S74).

Next will be described specific a method of printing test patterns and a method of selecting the printing ratio.

In the present embodiment, predetermined patterns are printed by four paths in which the image printing is completed with four times of scanning in total in the forward and backward directions, as is the case in actual printing. The time difference unevenness occurs more prominent at a higher total printing duty, while it tends to be less prominent at a lower duty. Therefore, the total printing duty of test pattern images according to the present embodiment is formed at 200% so that the time difference unevenness occurs prominent. However, the test patterns may not be restricted to images of a printing duty of 200% as long as time difference unevenness is visible.

Also, the test patterns according to the present embodiment are printed bi-directionally with cyan ink. Then, two sets of mask patterns having their respective different printing ratio that are stored preliminarily in a ROM110 are used to print the test patterns.

Figure 8A:
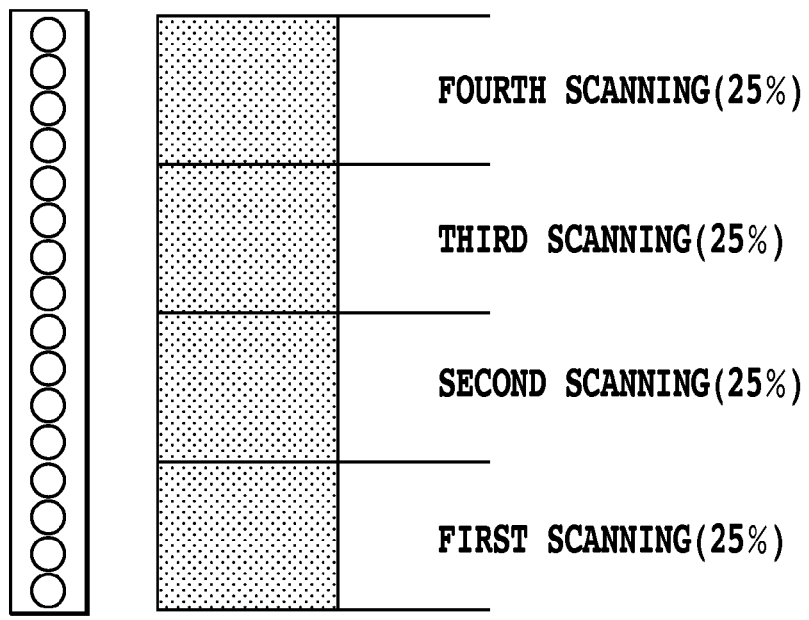
FIGS. 8A and 8B are views for illustrating mask patterns according to the first embodiment.
Figure 8B:
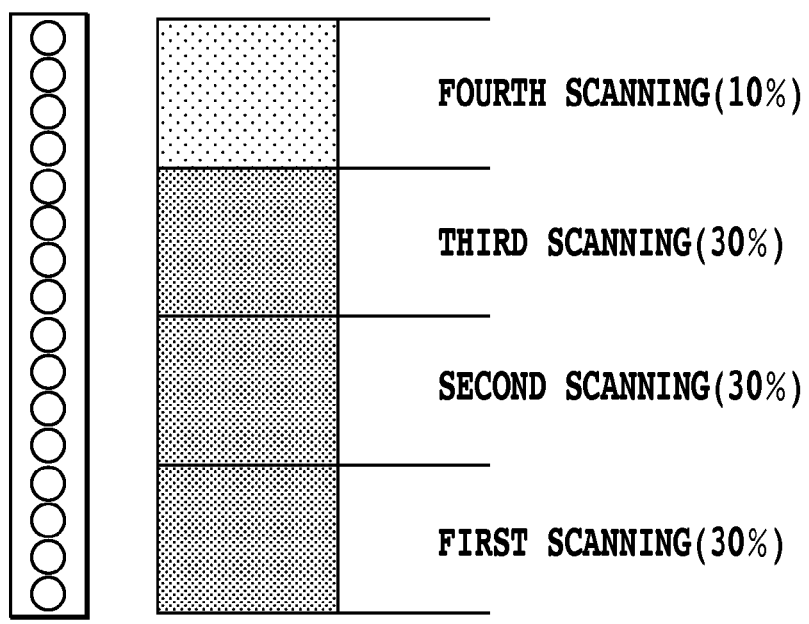
Figure 9A:
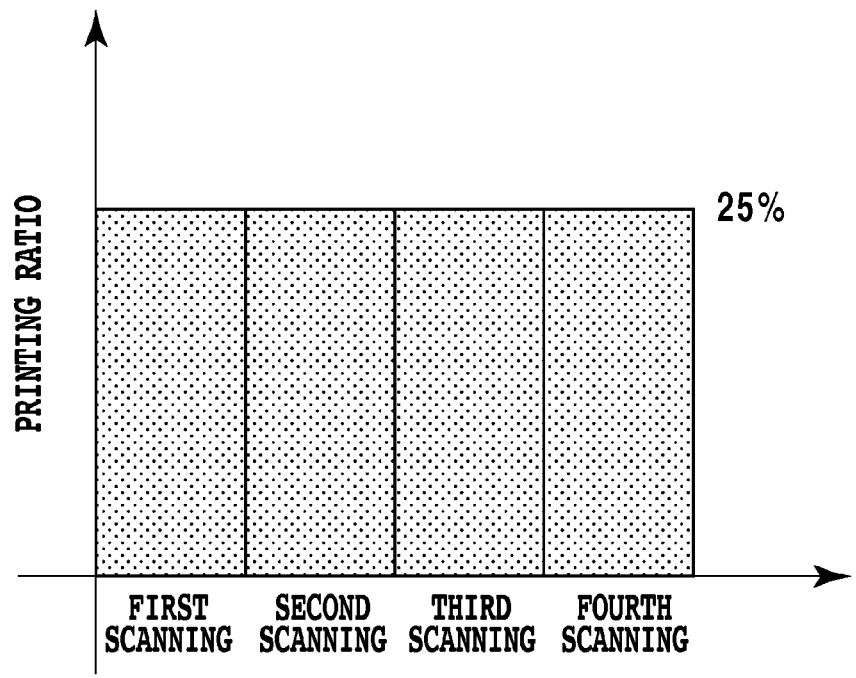
FIGS. 9A and 9B are views for illustrating the mask patterns according to the first embodiment.
Figure 9B:
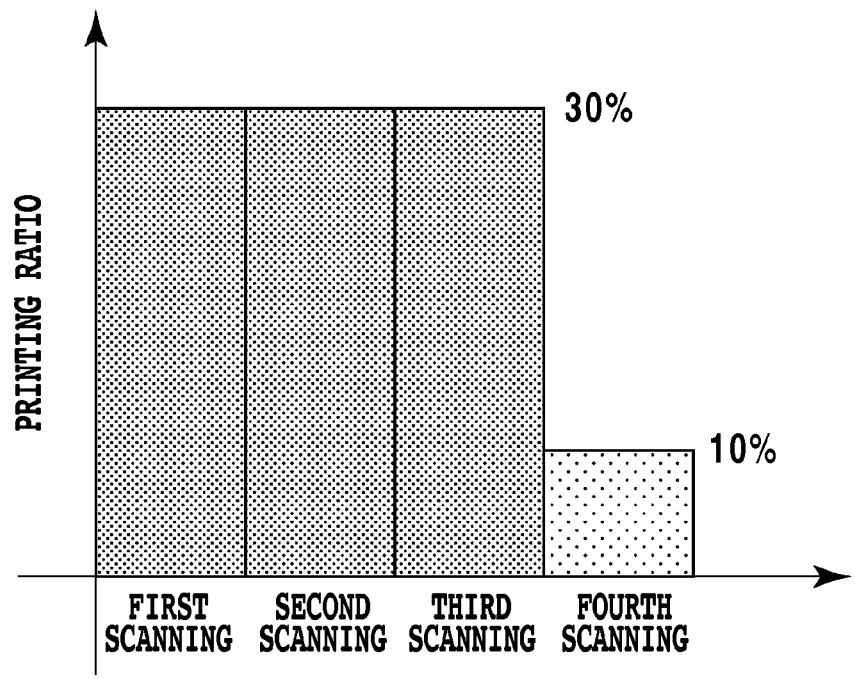

FIGS. 8A and 8B as well as FIGS. 9A and 9B are views for illustrating mask patterns printed in the present embodiment. FIGS. 8A and 8B are schematic views showing mask patterns corresponding to respective groups of nozzles. FIGS. 9A and 9B are graphs showing printing ratio of mask patterns in the case of printing test patterns, respectively, to FIGS. 8A and 8B. It is noted that although two types of mask patterns are provided and two test patterns are printed in the present embodiment, the present invention is not restricted to such two types of mask patterns. That is, it may have multiple mask patterns, and thus three types or more may be provided. And, it may be printed three or more test patterns.

FIG. 8A shows a mask pattern by which the binary printing date is distributed evenly by 25% from the first to fourth scanning. FIG. 8B shows a mask pattern by which the printing ratio is distributed 30%, 30%, 30%, and 10%, respectively, to the first, second, third, and fourth scanning. In the present embodiment, each test pattern is printed by 44 inches in the main scan direction and the width size of nozzle arrays in the sub-scan direction to create a test pattern.

The user then selects a test pattern with a smaller density difference by the look of two printed test patterns. The result of selection is then input for selection of printing ratio of the most suitable for the medium. It is noted that the user is not required to check the entire printed width, but only to determine by the look of the edges where time difference unevenness becomes most prominent. By the look of density differences between odd and even scanning areas, the user determines which pattern has a smaller density difference, and then selects the printing ratio for separate printing that result in the smallest density difference between the adjacent scanning areas.

Figure 10A:
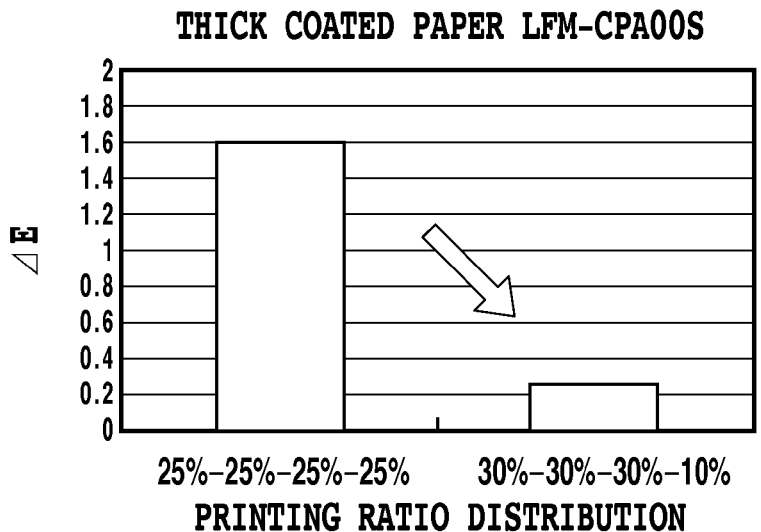
FIGS. 10A to 10C are graphs showing the density difference ($\Delta E$) between odd and even scanning areas for each type of medium when the printing ratio distribution is changed in the first embodiment.
Figure 10B:
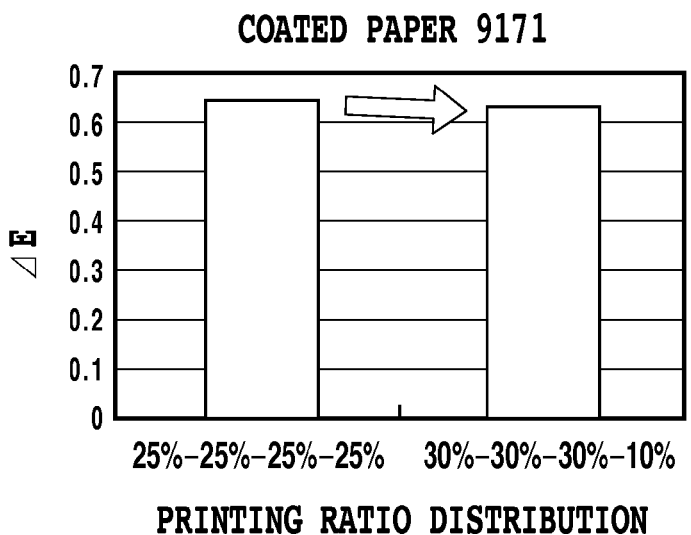
Figure 10C:
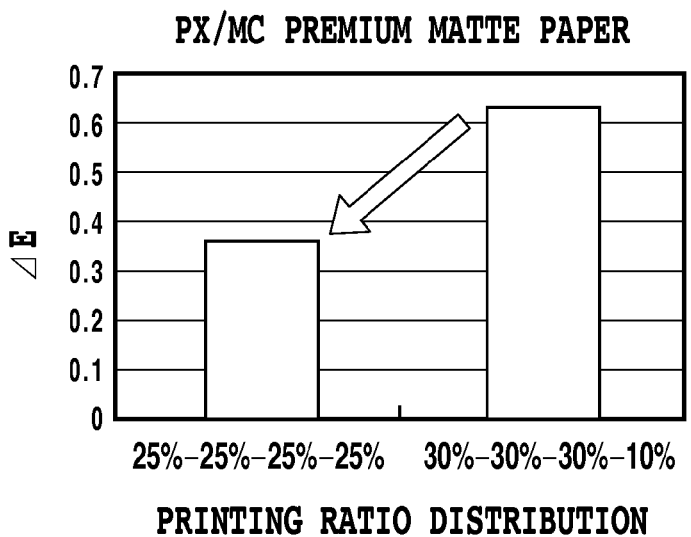

Here, FIGS. 10A to 10C are graphs showing the density difference (ΔE) between odd and even scanning areas for each type of medium when the printing ratio distribution is changed. Used ink is involved in an ink tank "PFI-102 C, M, Y, and K manufactured by Canon Inc." for imagePROGRAPH iPF700. The carriage speed during printing is 40 inches/second. Used media are thick coated paper LFM-CPA00S manufactured by Canon Inc., COATED PAPER 9171 manufactured by Canon Inc., and PX/MC premium matte paper manufactured by SEIKO EPSON Corp. The size of each used medium is 44 to 60 inches.

The thick coated paper LFM-CPA00S and COATED PAPER 9171 show smaller density difference with a printing ratio distribution of 30%-30%-30%-10%. On the other hand, the PX/MC premium matte paper shows a smaller density difference with a printing ratio distribution of 25%-25%-25%-25%.

It is thus found that the most suitable printing ratio distribution for reduction of time difference unevenness varies of each of medium. Accordingly, in the present embodiment, on media to which the most suitable printing ratio is not set, the most suitable printing ratio is selected by test patterns in accordance with the above-described procedure. Then, the mask pattern of selected printing ratio is used to process binary printing data and then generate ejecting data of each printing scan. The printing operation is performed based on the ejecting data.

Next will be described a method of scanning for printing when a user selects a mask pattern with a printing ratio of 30-30-30-10% based on test patterns.

Figure 11A:
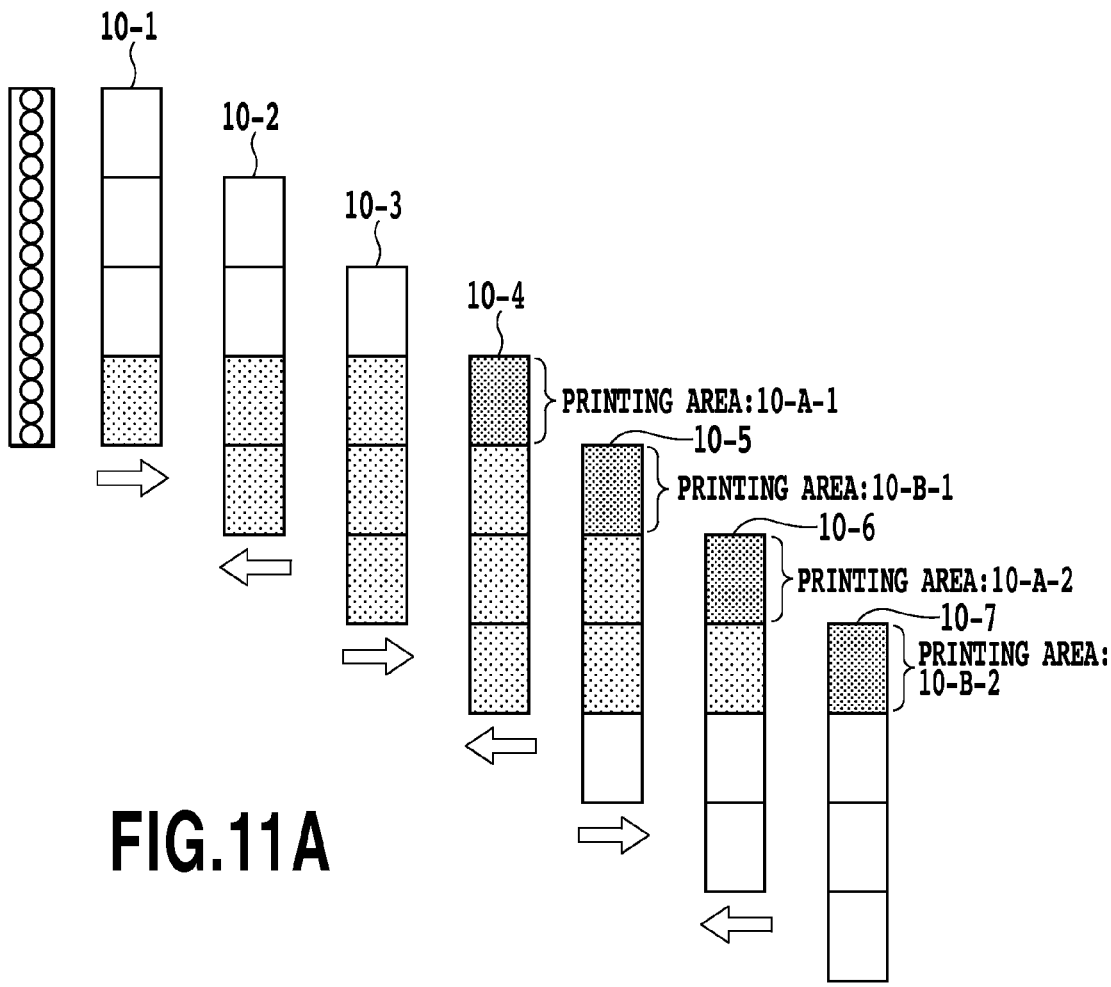
FIGS. 11A and 11B are views for illustrating a printing operation when a mask pattern with a printing ratio of 30-30-30-10% is used in the first embodiment.
Figure 11B:
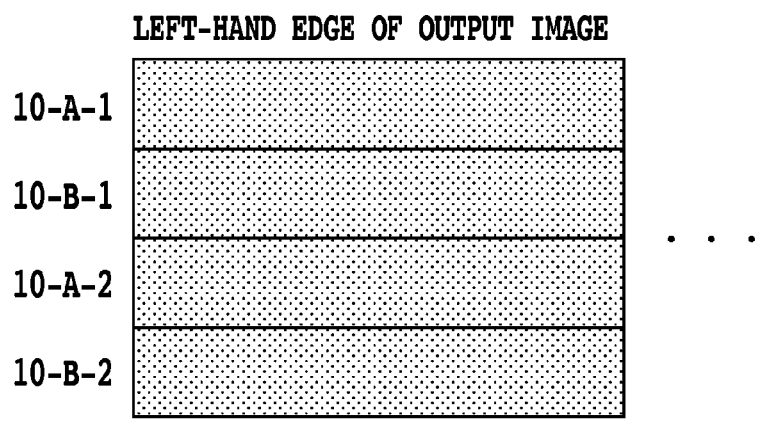

FIGS. 11A and 11B are views for illustrating a printing operation when a mask pattern with a printing ratio of 30-30-30-10% is selected as a result for selecting printing ratio. During a first scanning for printing 10-1, 30% of the to-be-printed dots which should be printed the printing area are printed in a printing area 10-A-1, and then during a second scanning for printing 10-2, another 30% of the to-be-printed dots are printed. Subsequently, during a third scanning 10-3, still another 30% of the to-be-printed dots are also printed. During a fourth scanning 10-4, the remaining 10% of the to-be-printed dots are printed. Further, in a printing area 10-B-1, 30% of the to-be-printed dots are printed, respectively, during first, second, and third scanning 10-2, 10-3, and 10-4, and then the remaining 10% of the to-be-printed dots are printed during a fourth scanning 10-5. The printing is thus performed sequentially in the same manner in each of printing area.

Figure 12:
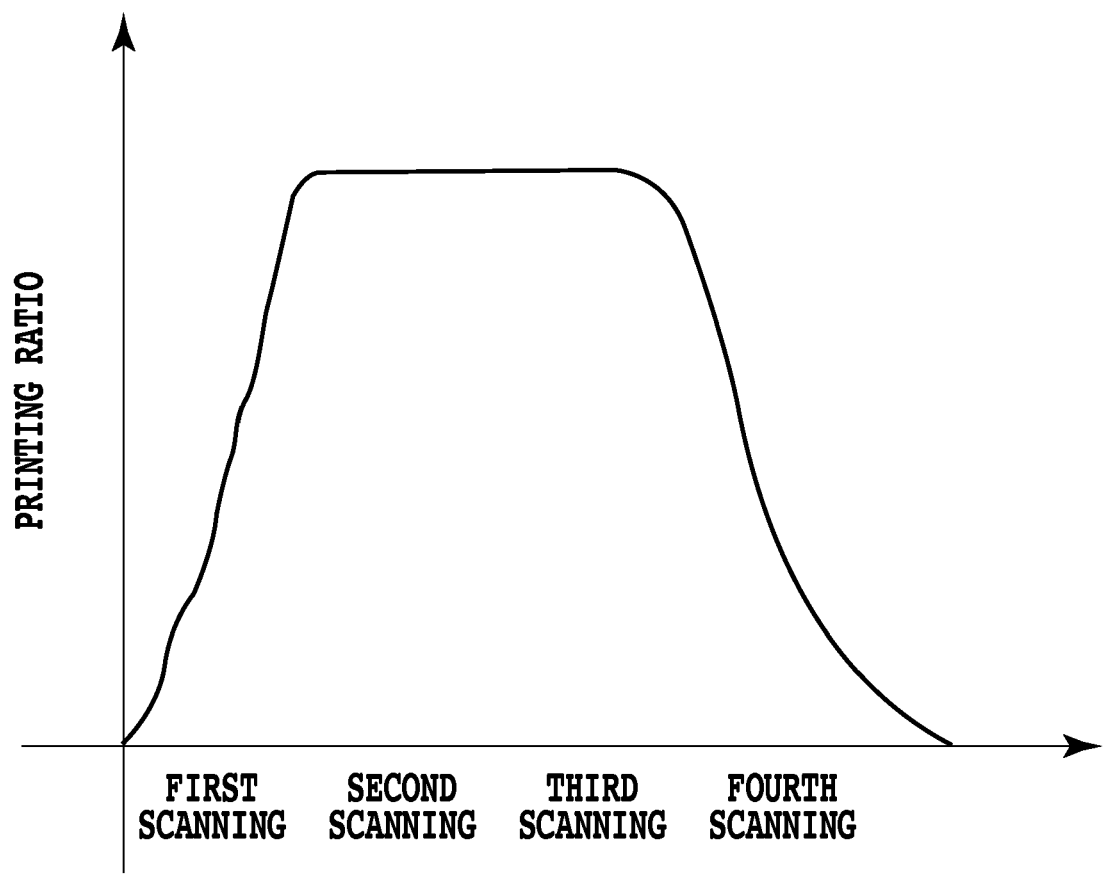
FIG. 12 is a view for illustrating another mask pattern according to the first embodiment.

It is noted that although the present embodiment adopts a pattern with an even printing ratio distribution as shown in FIGS. 8A and 9A and a pattern with the last path ratio being reduced as shown in FIGS. 8B and 9B, other printing ratio patterns may be adopted in the present invention. That is, the printing ratio distribution of a mask pattern to be used for test pattern printing in S71 and usual printing may be set to other than the two patterns above. As an exemplary printing ratio distribution, the printing ratio is different from first to fourth scanning, for example. Also, for example, in order to avoid occurrence of so-called "connection streaks" etc., such a smooth printing ratio with a peak as shown in FIG. 12 may be used for printing in a printing area.

Moreover, in the present invention, as for the medium to which printing ratio is not set, it is desirable to set up printing ratio by the test pattern fundamentally. It is not limited to the thick coated paper shown with this embodiment, but it is desirable also matte coated paper, so-called glossy paper or plain paper may adaptively be used for example.

In addition, not only dye-based ink but also pigment-based ink may adaptively be used as an ink.

Test patterns may be printed with other than cyan ink such as MYK, though printed only with cyan ink as a first-order color in the present embodiment. Further, test patterns may be printed not only with a first-order color but also with second- and/or third-order colors.

Second Embodiment

Although the first embodiment is for the case where a user selects the most suitable test pattern of smaller density difference from plurality test patterns differs of printing ratio based on visible of the user. However, the present invention is not restricted to such a case where a user makes a selection based on visible of the user. For example, a density sensor such as an optical sensor may be used to measure the optical characteristics of test patterns and thereby to select a test pattern of smaller density difference.

Figure 13:
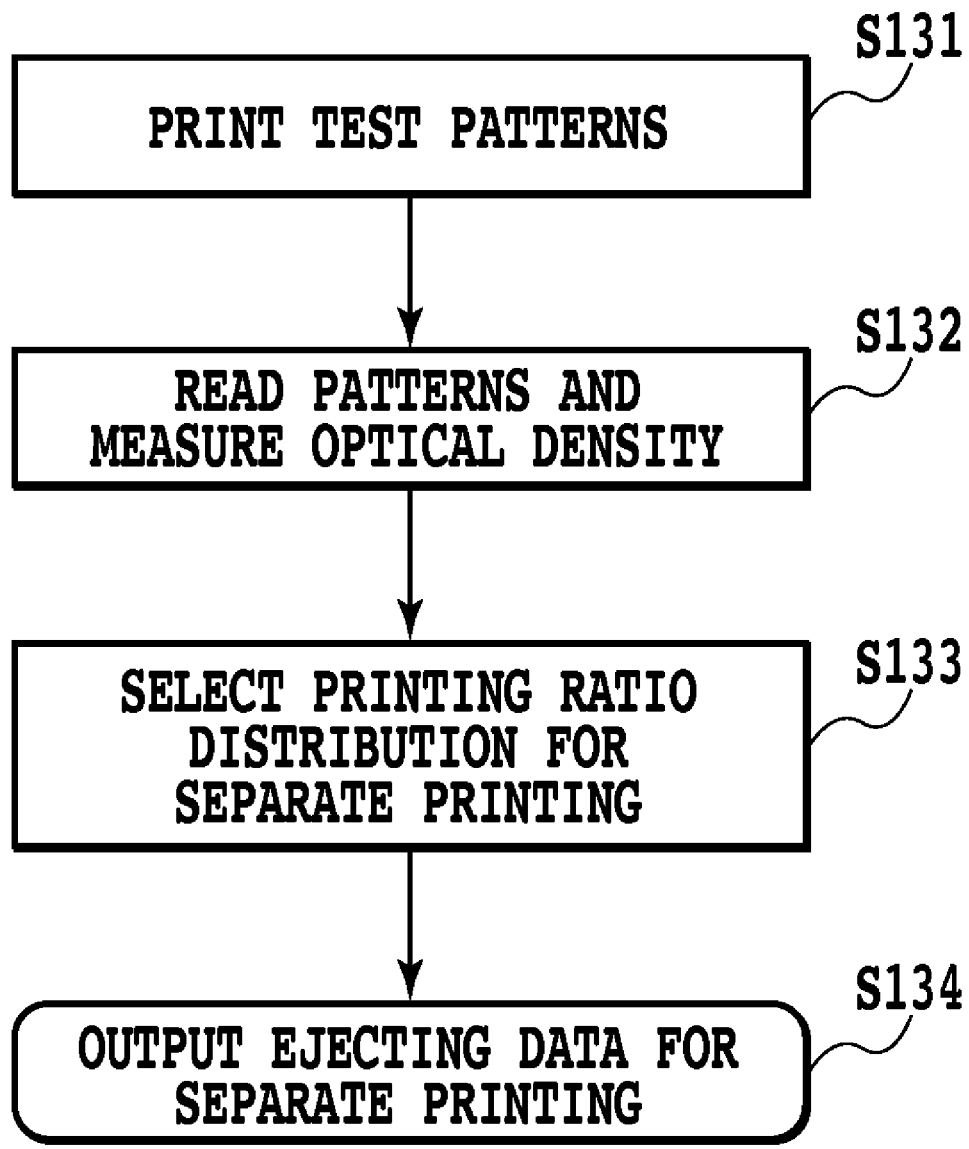
FIG. 13 is a flow chart schematically showing processing for printing ratio selection according to a second embodiment.

FIG. 13 is a flow chart schematically showing processing for printing ratio selection according to the present embodiment. Predetermined test patterns are first printed (S131), as is the case in the first embodiment. Next, a density sensor installed in the printer 104 is used to measure the optical characteristics (for example, reflective optical density) of the printed test patterns (S132). Then, a test pattern without unevenness is determined based on the measured optical characteristic (S133). In actual printing, ejecting data is then generated using a mask pattern having printing ratio which selected test pattern is printed, and the ejecting data is used for printing on a printing medium (S134).

Figure 14A:
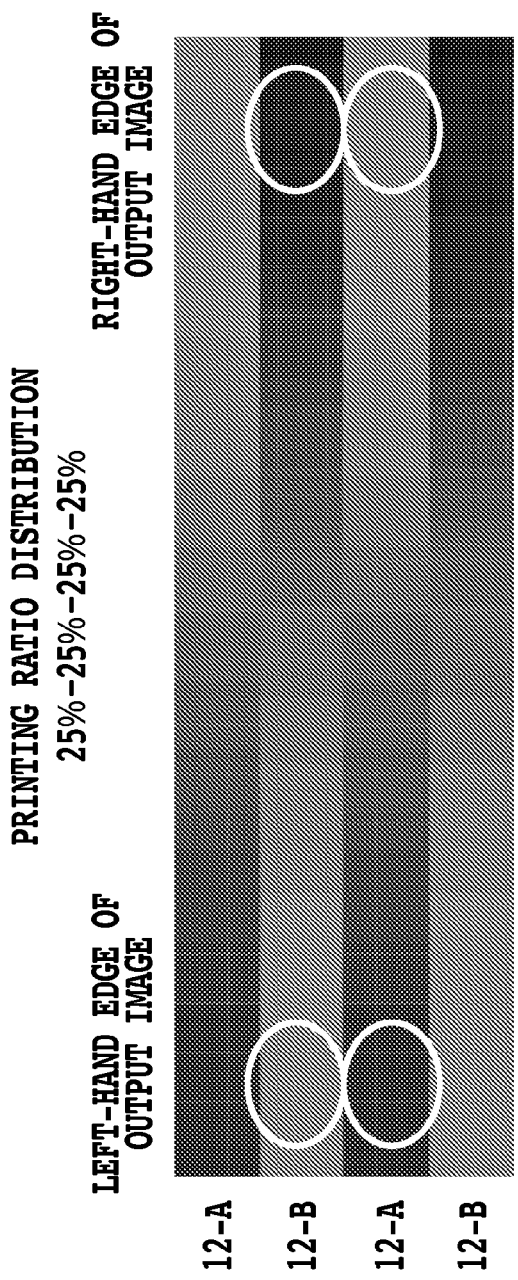
FIGS. 14A and 14B are views showing test patterns according to the second embodiment.
Figure 14B:
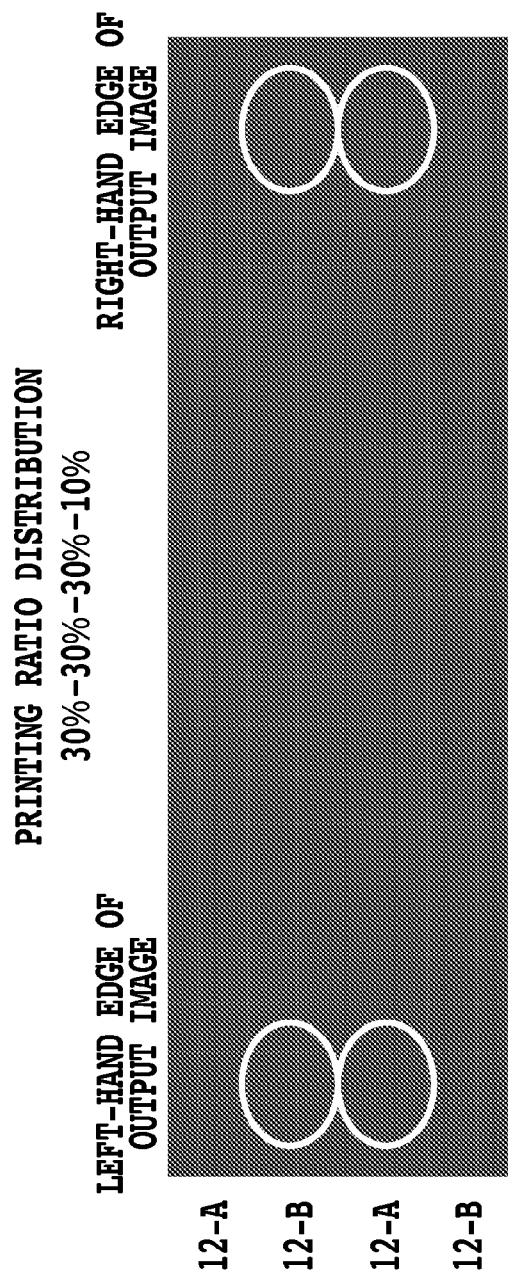

The optical characteristics are measured by installing a reflective density sensor (optical sensor) on the carriage M4000 shown in FIG. 3 and reading the reflective optical density. In the present embodiment, the same test patterns as in the first embodiment are printed, and then the density in the second scanning and third scanning printing areas are measured at the both edges of each output test pattern, as shown in FIGS. 14A and 14B.

It is noted that although the optical characteristics are measured by detecting reflected light intensity, reflectivity, and reflective optical density in the present embodiment, other optical characteristics to be detected may be measured as long as they are capable of detecting whether the printed image reflects incident light.

Then, the result of measurement is used to calculate average amount of the density difference between both edges of the second scanning and the density difference between both edges of third scanning, the printing ratio of test pattern of the smallest average amount of the density difference is selected as most suitable printing ratio.

The optical characteristics of test pattern are thus measured by optical sensor and thereby the suitable printing ratio can be determined for each medium, without effort of user.

Third Embodiment

Although test patterns are printed in the entire width of main scan direction of a printing medium in the first and second embodiments, the present invention is not restricted to such test patterns. In the present embodiment, printing is not performed through the entire width of main scan direction of a printing medium, but is performed with a weight depending on the time difference between scanning thereof.

The present embodiment can be applied regardless of whether the size of a printing medium is given in advance. The case where the size of a printing medium is not given in advance will hereinafter be described. If the size of a printing medium is given in advance, test patterns may be printed based on a predefined time between scanning without calculating the time between scanning.

Figure 15:
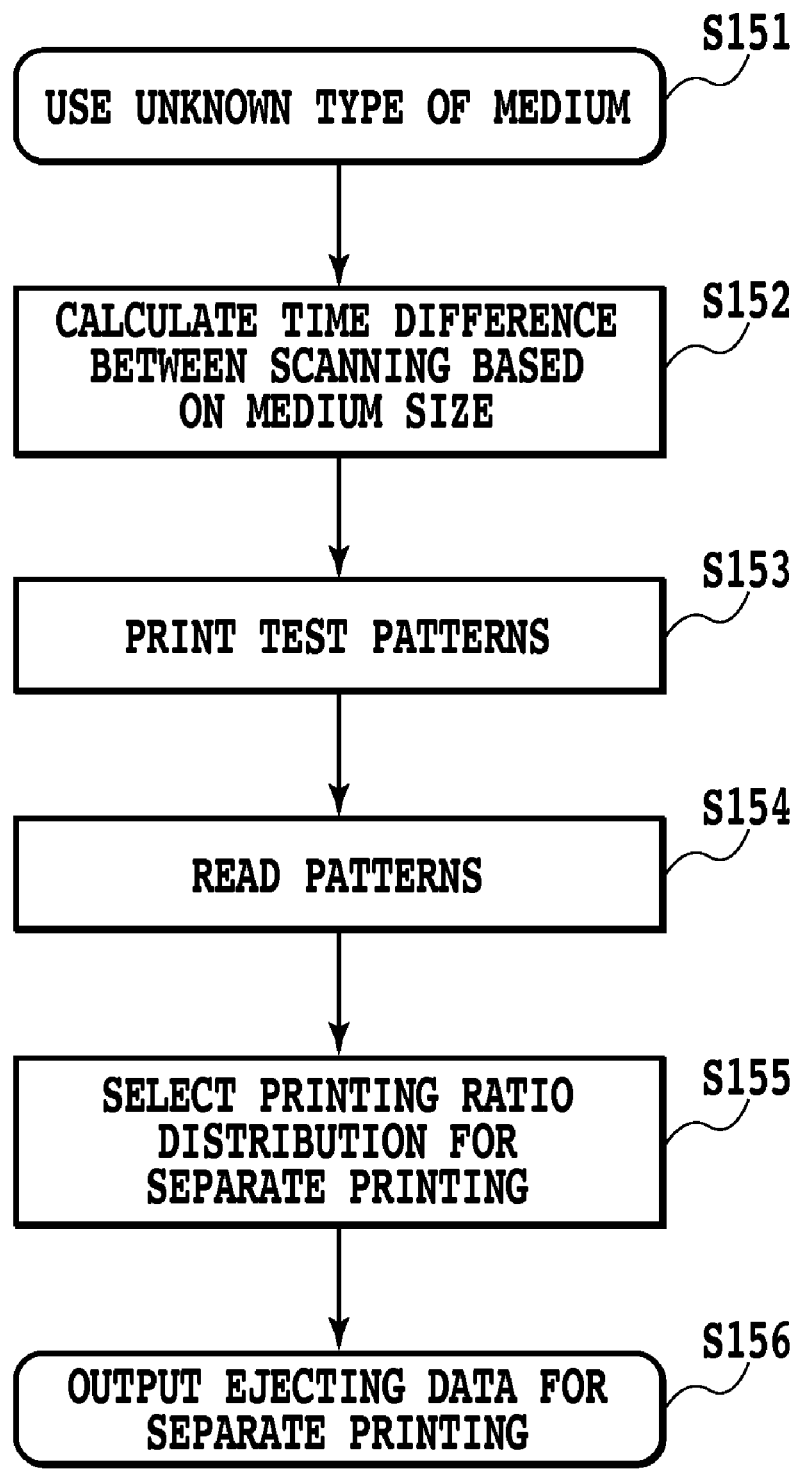
FIG. 15 is a flow chart schematically showing processing for printing ratio selection according to a third embodiment.

FIG. 15 is a flow chart schematically showing processing for printing ratio selection according to the present embodiment. The time difference between scanning is first calculated based on the size of a medium used (S152). In addition, the size of media may be detected by the optical sensor provided in the carriage, or may be calculated from media information by inputting the information about media into printing apparatus or into PC connected to printing apparatus. Next, predetermined patterns printed the image of the edge part of scanning area are printed (S153). A density sensor installed in the printer 104 is then used to measure the optical characteristics of the printed test patterns (S154). Then, a test pattern without unevenness is selected based on the result of the measured optical characteristic (S155). In actual printing, ejecting data is generated by the mask pattern which is based on printing ratio to be printed selected test pattern, and the ejecting data is used for printing on the printing medium (S156).

It is noted that although a density sensor is used in the present embodiment to measure the optical characteristics and thereby to select a test pattern without unevenness, as is the case in the second embodiment, a user may select based on visible of the user, as is the case in the first embodiment.

The size of a printing medium (medium size) to be used in the present embodiment is assumed 44 inches to 60 inches. Between scanning for printing with a smaller time difference at an edge of a printing medium, the time difference is about 0.2 seconds because the next printing occurs after the previous scanning for printing and reversing that follows a free running distance of about a few centimeters for acceleration and deceleration. On the other hands, the scanning for printing with a larger time "T" difference is calculated from the scanning time for back-and-forth printing as the sum of the time for forward printing through the medium size, reversing of the carriage, and backward printing. If the carriage speed "v" is 40 inches/second and the medium size L is 44 inches, the larger time difference is about 2.4 seconds, resulting from the calculation formula: $T=2 \times L/v+0.2$.

In the present embodiment, predetermined test patterns are printed by four paths in which the image printing is completed with four times of scanning. The test patterns according to the present embodiment have the same printing ratio as those in the first and second embodiments. Then, the printing of the test pattern is performed using the calculated time difference by above calculation formula to simulate the left edge of an image having a size equivalent to 44 inches.

Figure 16A:
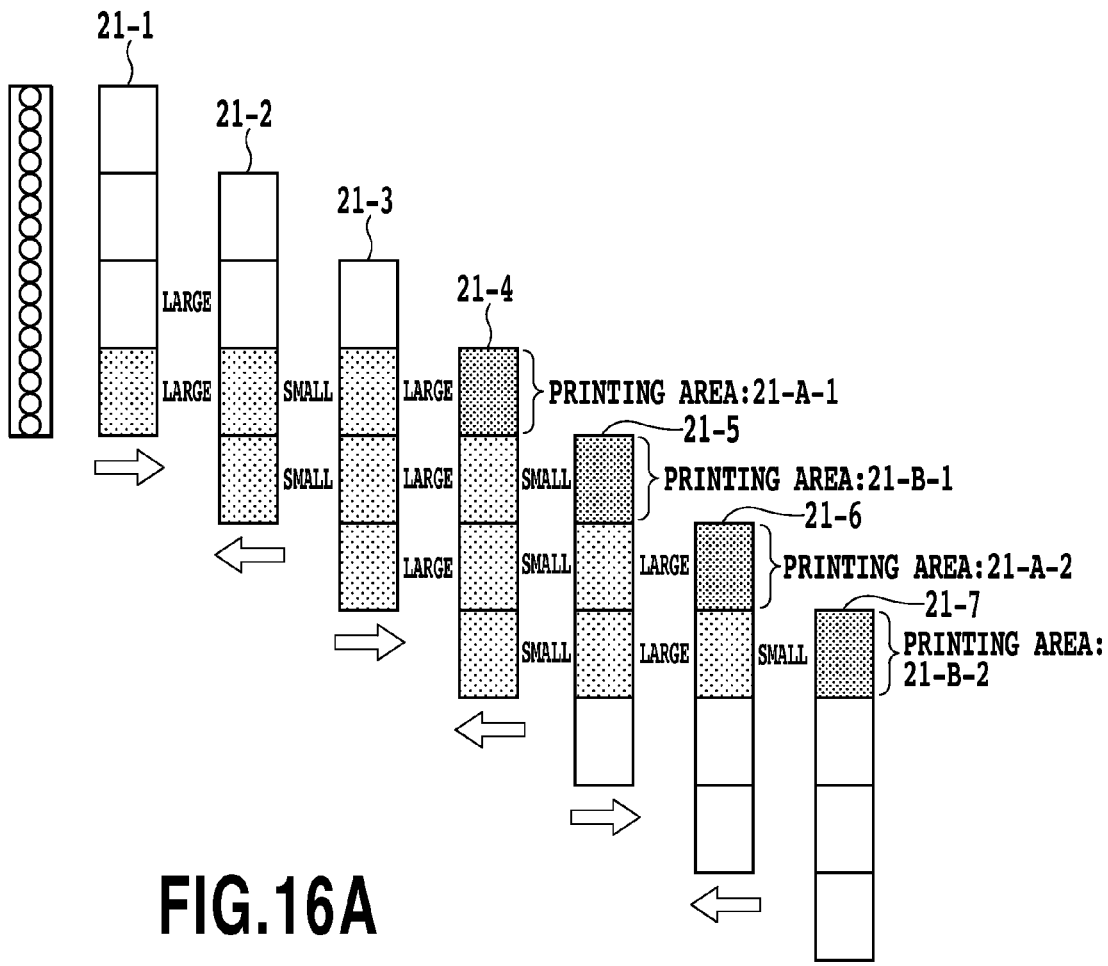
FIGS. 16A and 16B are views for illustrating a printing operation when a mask pattern with a printing ratio of 30-30-30-10% is used in the third embodiment.
Figure 16B:
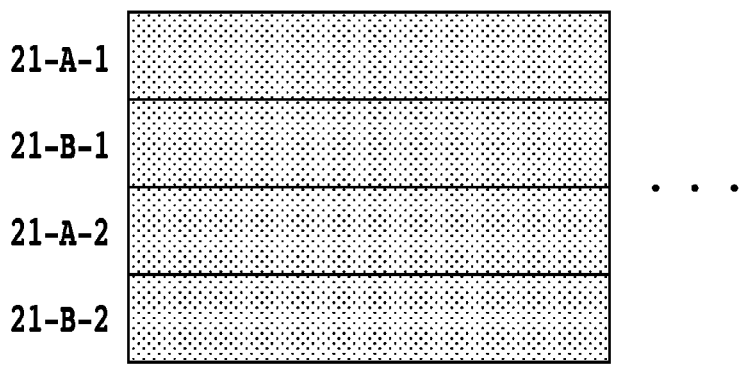

FIGS. 16A and 16B are views for illustrating a printing operation when a mask pattern with a printing ratio of 30-30-30-10% is used for printing. During a first scanning 21-1, 30% of the to-be-printed dots are printed in a printing area 21-A-1. On the printing media of the left edge part which the first scan start, since the time difference between the first and second scanning is large, the scanning is halted and waited at that point for about 2.4 seconds, which is calculated for a larger time difference, after the first scanning. Next, another 30% of the to-be-printed dots are printed during a second scanning for printing 21-2. Subsequently, on the printing media of the left edge part, since the time difference between the second and third scanning is small, still another 30% of the to-be-printed dots are printed during a third scanning 21-3. Since the time difference between the third and fourth scanning is large, the scanning is halted at that point for about 2.4 seconds after the third scanning, and then the remaining 10% of the to-be-printed dots are printed during a fourth scanning 21-4.

Figure 17A:
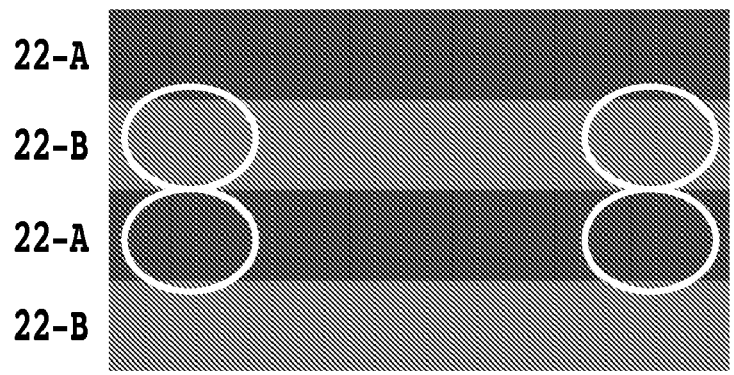
FIGS. 17A and 17B are views showing test patterns according to the third embodiment.
Figure 17B:
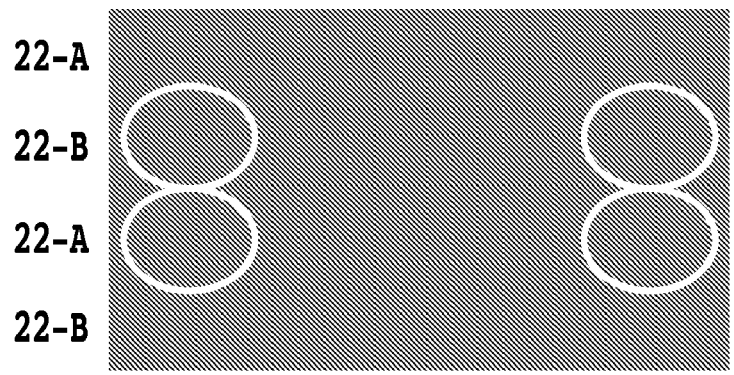

Further, in a printing area 21-B-1, 30% of the to-be-printed dots are printed during a first scanning 21-2. On the left edge part of this printing area 21-B-1, since the time difference between the first and second scanning is small, after immediate reversing, another 30% of the to-be-printed dots are printed during a second scanning 21-3. Subsequently, since the time difference between the second and third scanning is large, the scanning is halted at that point for about 2.4 seconds after the second scanning, and then still another 30% of the to-be-printed dots are printed during a third scanning 21-4. Since the time difference between the third and fourth scanning is small, after immediate reversing, the remaining 10% of the to-be-printed dots are printed during a fourth scanning 21-5. Thus waiting for time difference between scans by calculating allows the test pattern of the left edge of an image having a size equivalent to 44 inches to be simulated. This can save the amount of the use of printing media for printing test pattern. The same test patterns as in the above-described embodiments are printed, and then the density in the second and third scanning and printing areas is measured at the edges of each test pattern, as shown in FIGS. 17A and 17B. Then, most suitable printing ratio can be set by the test patter having smallest unevenness.

Other Exemplary Variations

Although the above-described present embodiment describes the case of four-path printing as an example, the present invention is not restricted to four-path printing, and printing may be performed through three paths or less or five paths or more. On the printing apparatus which can choose two or more printing modes in which the numbers of paths of multipass print differ especially, it is desirable to generate a test pattern for every number of paths, and to determine for the most suitable printing ratio.

Moreover, even if it does not print a test pattern for every number of paths, it may determine automatically the printing ratio in other numbers of paths from the result of the test pattern, for example, of 4 path printing. FIGS. 18A, 18B, 19A and 19B show the example of the printing ratio of three path printing and six times path printing in the case that the most suitable printing ratio in four path printing is determined as 30-30-30-10 by the test pattern of four paths printing.

Figure 18A:
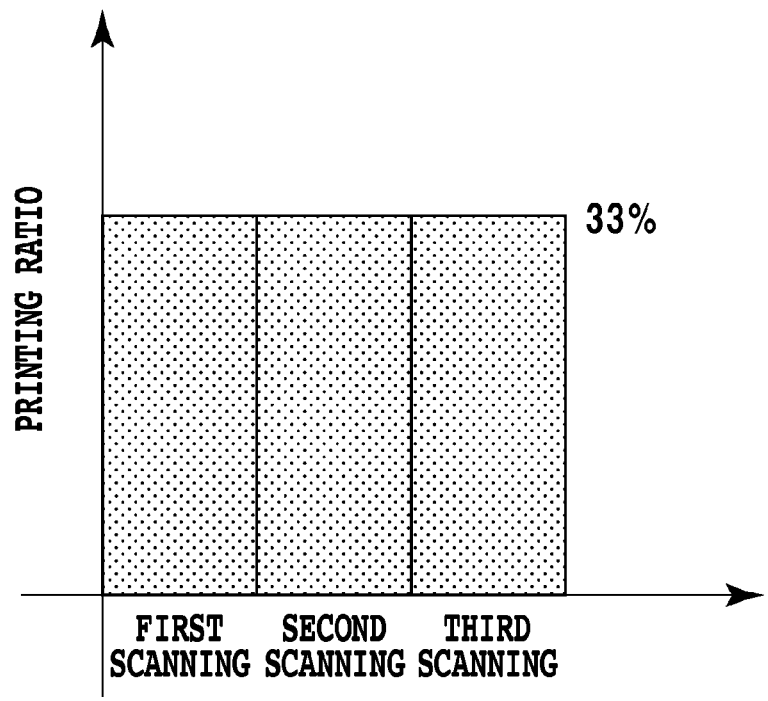
FIGS. 18A and 18B are views for illustrating mask patterns according to another embodiment.
Figure 18B:
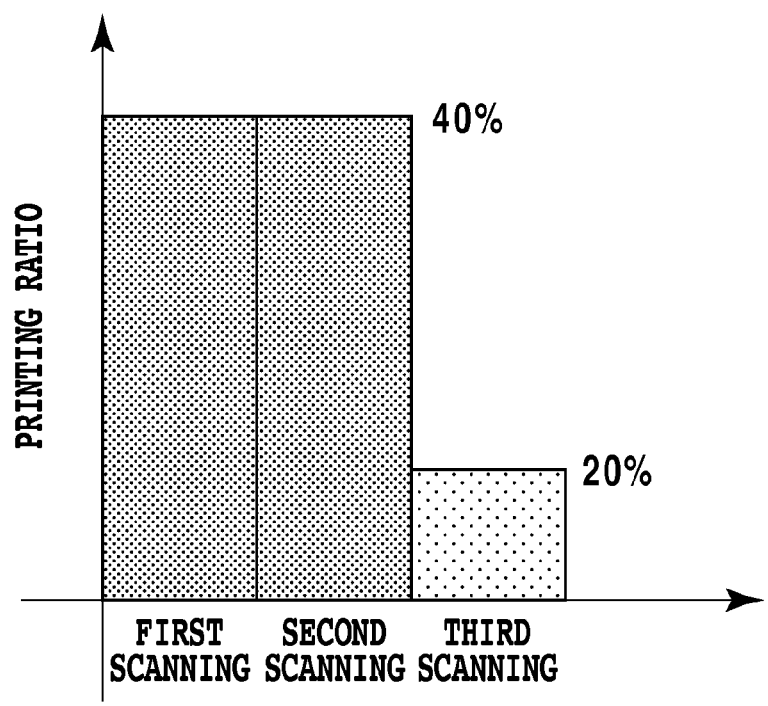

FIGS. 18A and 18B are views showing printing ratio in each of the scan for three-path printing in which the image printing is completed with three times of scanning. The printing ratio for each scanning is averagely higher than in the case of four path printing.

Figure 19A:
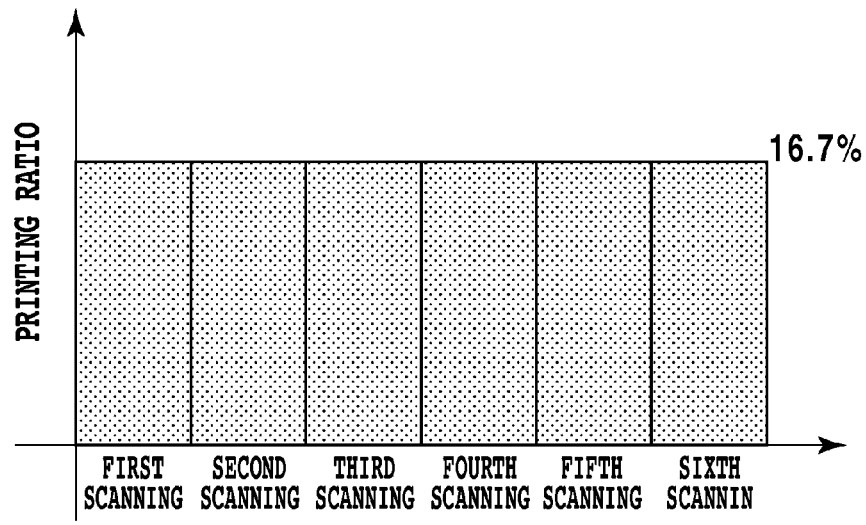
FIGS. 19A and 19B are views for illustrating the mask patterns according to another embodiment.
Figure 19B:
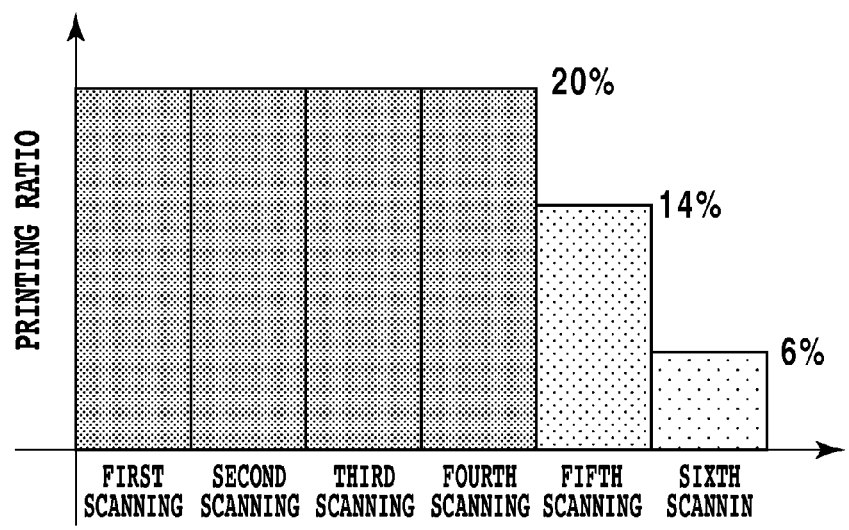

Also, FIGS. 19A and 19B show are views showing the printing ratio in each of the scan for six-path printing in which the image printing is completed with six times of scanning. The printing ratio for each scanning is averagely lower than in the case of four path printing.

Figure 20B:
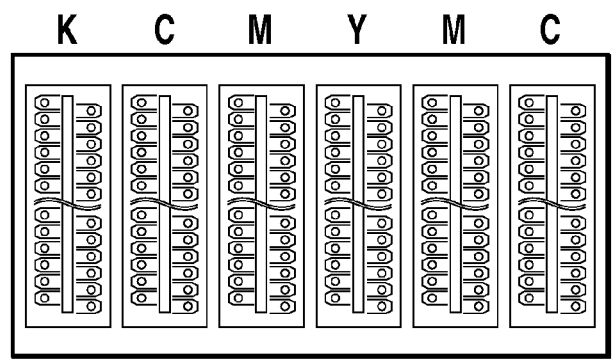
FIGS. 20A and 20B are views showing a nozzle arrangement in each print head according to another embodiment.
Figure 20A:
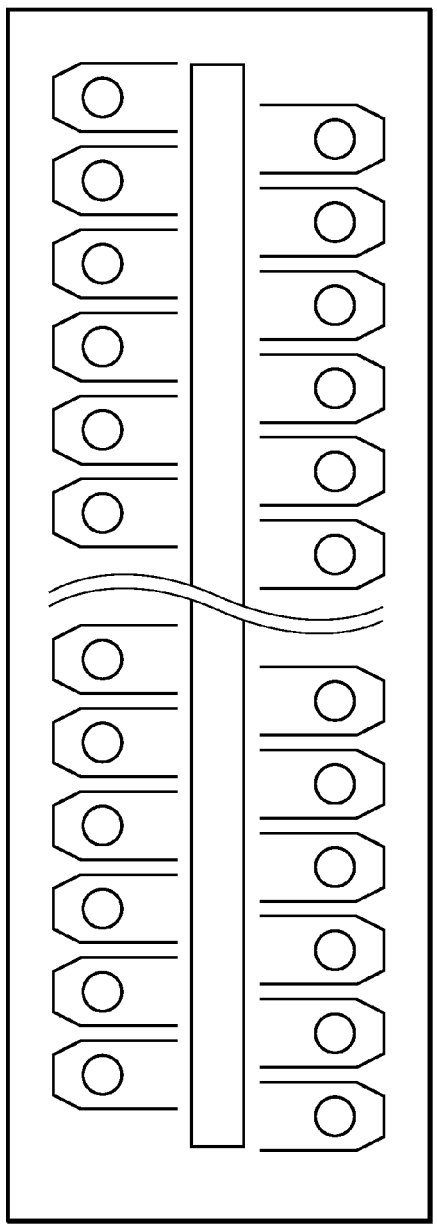
Figure 21:
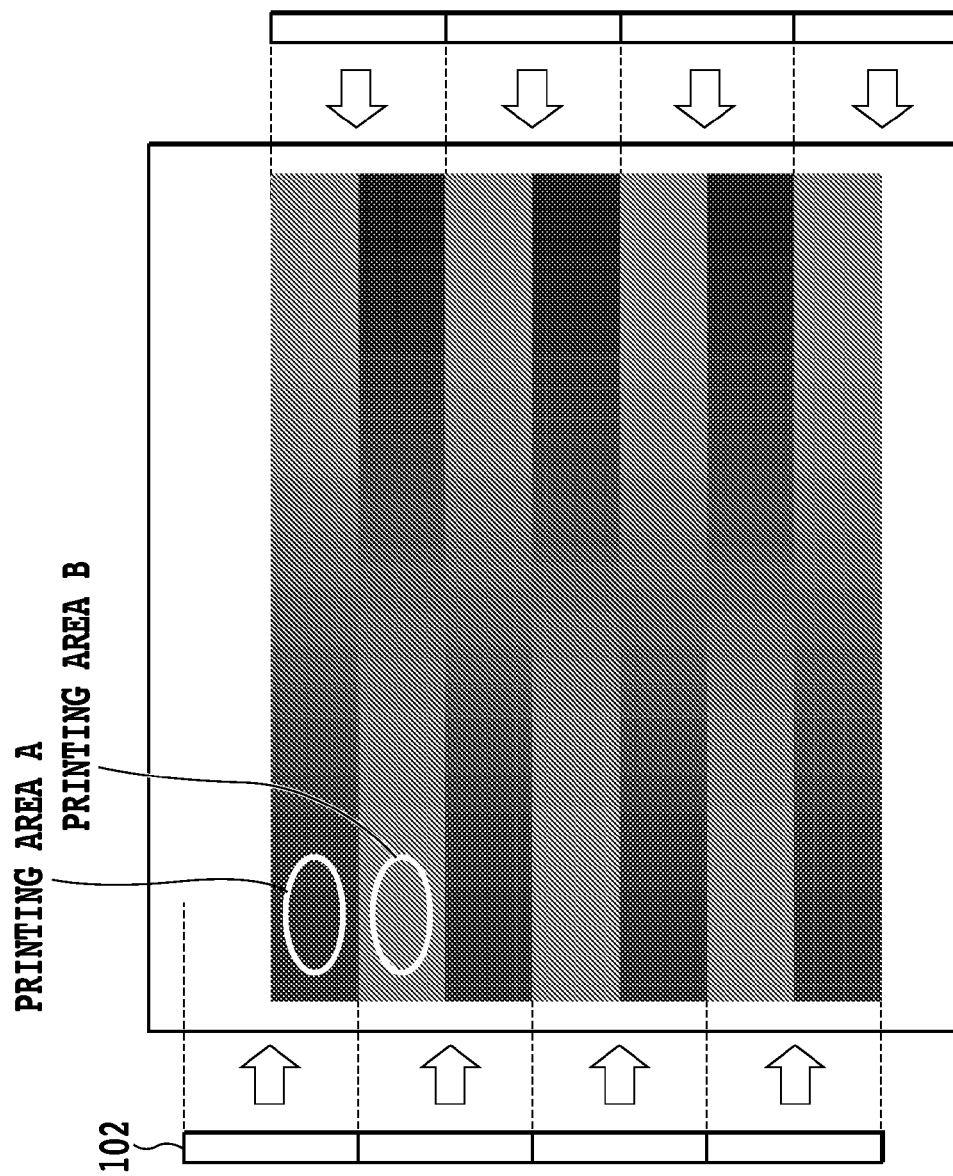
FIG. 21 is a view for illustrating time difference unevenness in the case of two-path printing.
Figure 22A:
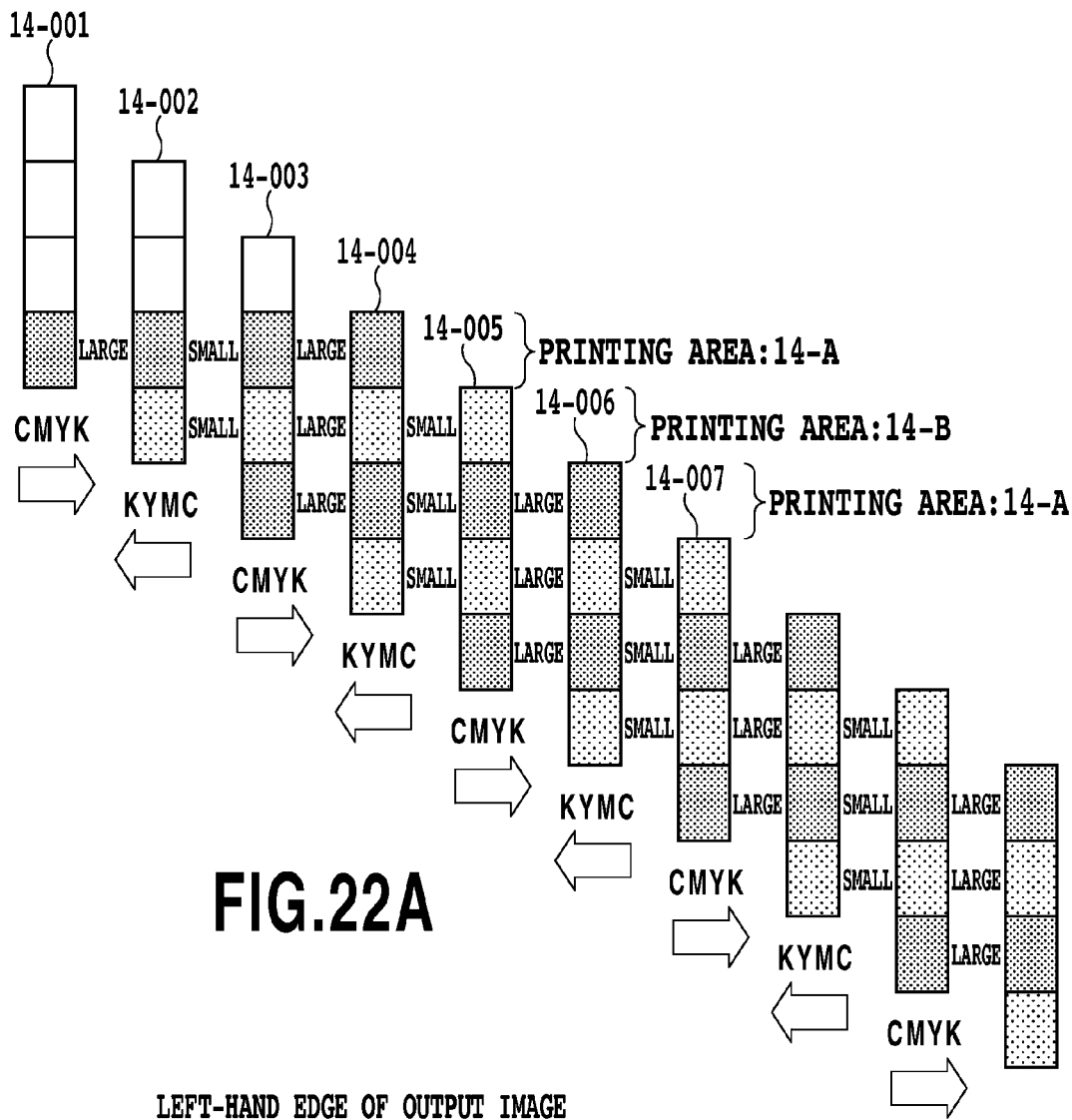
FIGS. 22A and 22B are views for illustrating time difference unevenness in the case of four-path printing.
Figure 22B:
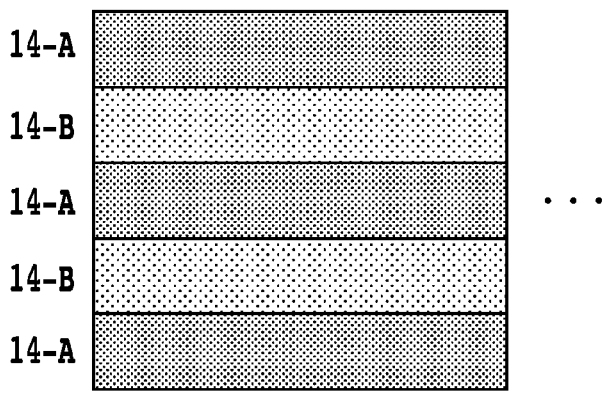
Figure 23:
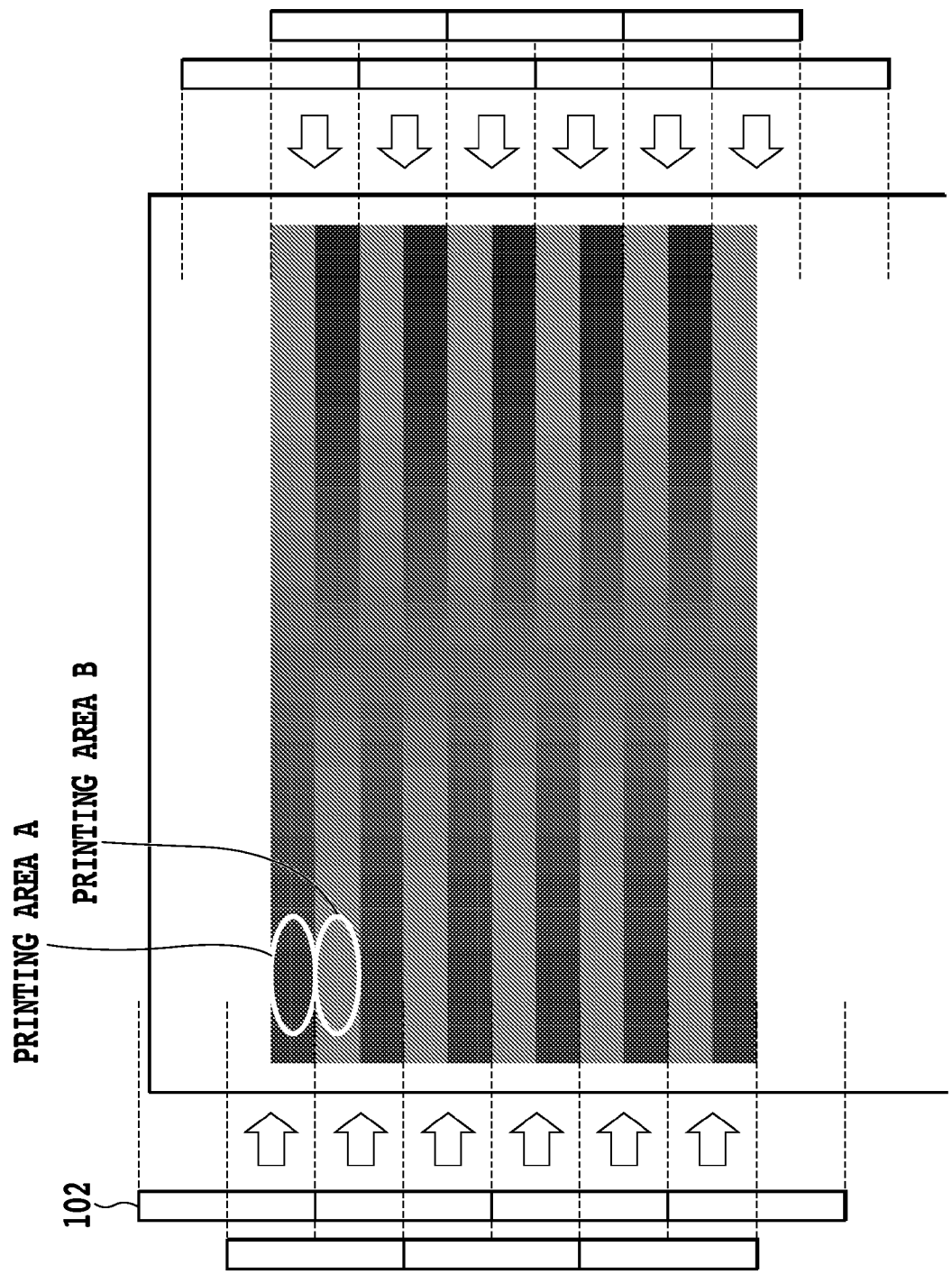
FIG. 23 is a view for illustrating time difference unevenness in the case of three-path printing.

Although the above-described embodiments adopt a print head having such a CMYK nozzle arrangement as shown in FIGS. 2A and 2B, the present invention is not restricted to such a print head. For example, such a print head as shown in FIGS. 20A and 20B may be applied in which nozzle arrays of the same color are arranged symmetrically with respect to the center of the head.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-329337, filed Dec. 20, 2007, which is hereby incorporated by reference herein in its entirety.

What is claimed is:

1. An inkjet printing method for printing an image by scanning a print head, which ejects ink and reciprocates over a print medium, comprising the steps of:

printing a plurality of test pattern images by scanning the print head N times over a print medium of a predetermined type, where N is an integer of 2 or more, wherein for each of the plurality of test pattern images, the total amount of ink applied per unit area by the N times of scans is the same, and wherein for each of the plurality of test pattern images, the amount of ink applied per unit area for each of at least two scans among $1^{st}$ through $N^{th}$ scans is different than the amount of ink applied per unit area for each of scans corresponding to said at least two scans for each of the other of the plurality of test pattern images;

receiving information corresponding to one test pattern image selected from among the plurality of test pattern images printed at the printing step; and in the case of performing a printing on said print medium of a predetermined type, setting printing ratios for $1^{st}$ through $N^{th}$ scans to printing ratios that correspond respectively to the amounts of ink applied during the $1^{st}$ through $N^{th}$ scans of said selected test pattern image.

2. The inkjet printing method according to claim 1, wherein the plurality of test pattern images includes a test pattern image in which the amount of ink applied per unit area at said $N^{th}$ scan is less than the amount of ink applied per unit area at each of the $1^{st}$ scan through the $(N-1)^{th}$ scans.

3. The inkjet printing method according to claim 1, wherein the plurality of test pattern images includes a test pattern in which the amount of ink applied per unit area at each of the $1^{st}$ through the $N^{th}$ scans is equal.

4. The inkjet printing method according to claim 1, wherein the printing step includes a conveying step for conveying the print medium at least once in a direction crossing the scanning direction of the print head between the N scans of the print head.

5. The inkjet printing method according to claim 1, further comprising a generation step for generating data corresponding to the N scans of the print head over said print medium of a predetermined type based on the printing ratios set in said setting step.

6. An inkjet printing apparatus for printing an image by scanning a print head, which ejects ink, back-and-forth over a print medium, comprising:

a printing device for printing a plurality of test pattern images by scanning the print head N times over a print medium of a predetermined type, where N is an integer of 2 or more, wherein for each of the plurality of test pattern images, the total amount of ink applied per unit area by $1^{st}$ through $N^{th}$ scans is the same, and wherein for each of the plurality of test pattern images, the amount of ink applied per unit area for each of at least two scans among the $1^{st}$ through $N^{th}$ scans is different than the amount of ink applied per unit area for each of scans corresponding to said at least two scans for each of the other of the plurality of test pattern images;

a receiving device for selecting one test pattern image from among the plurality of test pattern images printed and receiving information from the selected test pattern; and a setting device for, in the case of performing a printing on said print medium of a predetermined type, setting printing ratios for $1^{st}$ through $N^{th}$ scans to printing ratios that correspond respectively to the amounts of ink applied during the $1^{st}$ through Nth scans of said selected test pattern image.

* * * * *